United States Patent
Kotani

(10) Patent No.: US 7,434,233 B2
(45) Date of Patent: Oct. 7, 2008

(54) INTER-PROGRAM COMMUNICATION APPARATUS, INTER-PROGRAM COMMUNICATION METHOD, COMPUTER-READABLE RECORDING MEDIUM, AND PROGRAM

(75) Inventor: Takuya Kotani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 789 days.

(21) Appl. No.: 10/887,781

(22) Filed: Jul. 9, 2004

(65) Prior Publication Data

US 2005/0015774 A1 Jan. 20, 2005

(30) Foreign Application Priority Data

Jul. 16, 2003 (JP) ............................. 2003-275713
May 20, 2004 (JP) ............................. 2004-150737

(51) Int. Cl.
*G06F 3/00* (2006.01)
*G06F 9/44* (2006.01)
*G06F 9/46* (2006.01)
*G06F 13/00* (2006.01)

(52) U.S. Cl. .................. 719/329; 715/778; 715/788; 715/804; 719/312; 345/629

(58) Field of Classification Search ................. 719/312, 719/329; 715/804, 805, 806, 798, 517, 778, 715/781, 788, 790, 791, 795, 796, 800; 345/629
See application file for complete search history.

(56) References Cited

U.S. PATENT DOCUMENTS

| | | | |
|---|---|---|---|
| 5,301,268 A * | 4/1994 | Takeda ........................ 719/329 |
| 5,437,031 A * | 7/1995 | Kitami ......................... 719/312 |
| 5,461,716 A * | 10/1995 | Eagen et al. ................. 715/788 |
| 5,515,493 A * | 5/1996 | Boston et al. ................ 715/807 |
| 5,717,880 A * | 2/1998 | Imai et al. .................... 715/781 |
| 5,848,295 A * | 12/1998 | Anderson et al. .............. 710/7 |
| 5,867,633 A * | 2/1999 | Taylor et al. ................. 358/1.9 |
| 6,026,416 A * | 2/2000 | Kanerva et al. ............. 715/515 |
| 6,161,148 A * | 12/2000 | Pratt et al. ................... 719/315 |
| 6,181,338 B1 * | 1/2001 | Brodhun ..................... 715/798 |
| 6,654,036 B1 * | 11/2003 | Jones ........................... 715/798 |
| 6,753,886 B1 * | 6/2004 | Schuft .......................... 715/764 |
| 6,829,769 B2 * | 12/2004 | Cranston et al. ............. 719/312 |
| 7,027,181 B2 * | 4/2006 | Takamori ..................... 358/1.6 |
| 7,120,914 B1 * | 10/2006 | Manthos et al. .............. 718/108 |
| 2003/0081006 A1 * | 5/2003 | Sheldon et al. .............. 345/781 |
| 2004/0083481 A1 * | 4/2004 | Shultz et al. ................. 719/312 |
| 2008/0046837 A1 * | 2/2008 | Beauchamp et al. ......... 715/804 |

* cited by examiner

*Primary Examiner*—William Thomson
*Assistant Examiner*—Kimbleann Verdi
(74) *Attorney, Agent, or Firm*—Canon U.S.A. Inc., IP Division

(57) ABSTRACT

An inter-program communication method and apparatus for performing inter-program communication between an image correction program and an image print program. During an initialization phase, a communication path is established between the programs and the image correction program allocates an area of a shared memory to be shared with the image print program. Next, at a connection phase, the image print program uses the communication path to communicate, to the image correction program, a file number that specifies image data and a request for information about a process of decoding the image data. The image correction program performs a decoding process corresponding to the requested information on the image data specified by the file number and stores the data of the image data body and the attached information attached to the image data in the shared memory.

15 Claims, 18 Drawing Sheets

| COMMAND NAME | VALUE | DESCRIPTION |
|---|---|---|
| DECODE | 0x0000 TO 0x7F00 | DECODING REQUEST |
| SEND_MESSAGE_ID | 0xA000 | MESSAGE ID NOTIFICATION |
| SEND_WINDOW_HANDLE | 0xB000 | WINDOW HANDLE NOTIFICATION |
| END_PROCESS | 0xE000 | INTER-PROGRAM CONNECTION COMMUNICATION DISCONNECTION REQUEST |
| END_PARENT | 0xF000 | PROGRAM ENDING REQUEST |

FIG. 12

| |
|---|
| STATUS CODE (4 BYTES) |
| HEADER SIZE (4 BYTES) |
| OFFSET TO IMAGE DATA (4 BYTES) |
| IMAGE DATA SIZE (4 BYTES) |
| OFFSET TO INFORMATION DURING PHOTOGRAPHING TIME (4 BYTES) |
| DATA SIZE OF INFORMATION DURING PHOTOGRAPHING TIME (4 BYTES) |
| OFFSET TO ICC PROFILE (4 BYTES) |
| DATA SIZE OF ICC PROFILE (4 BYTES) |
| IMAGE DATA |
| INFORMATION DURING PHOTOGRAPHING TIME |
| ICC PROFILE |

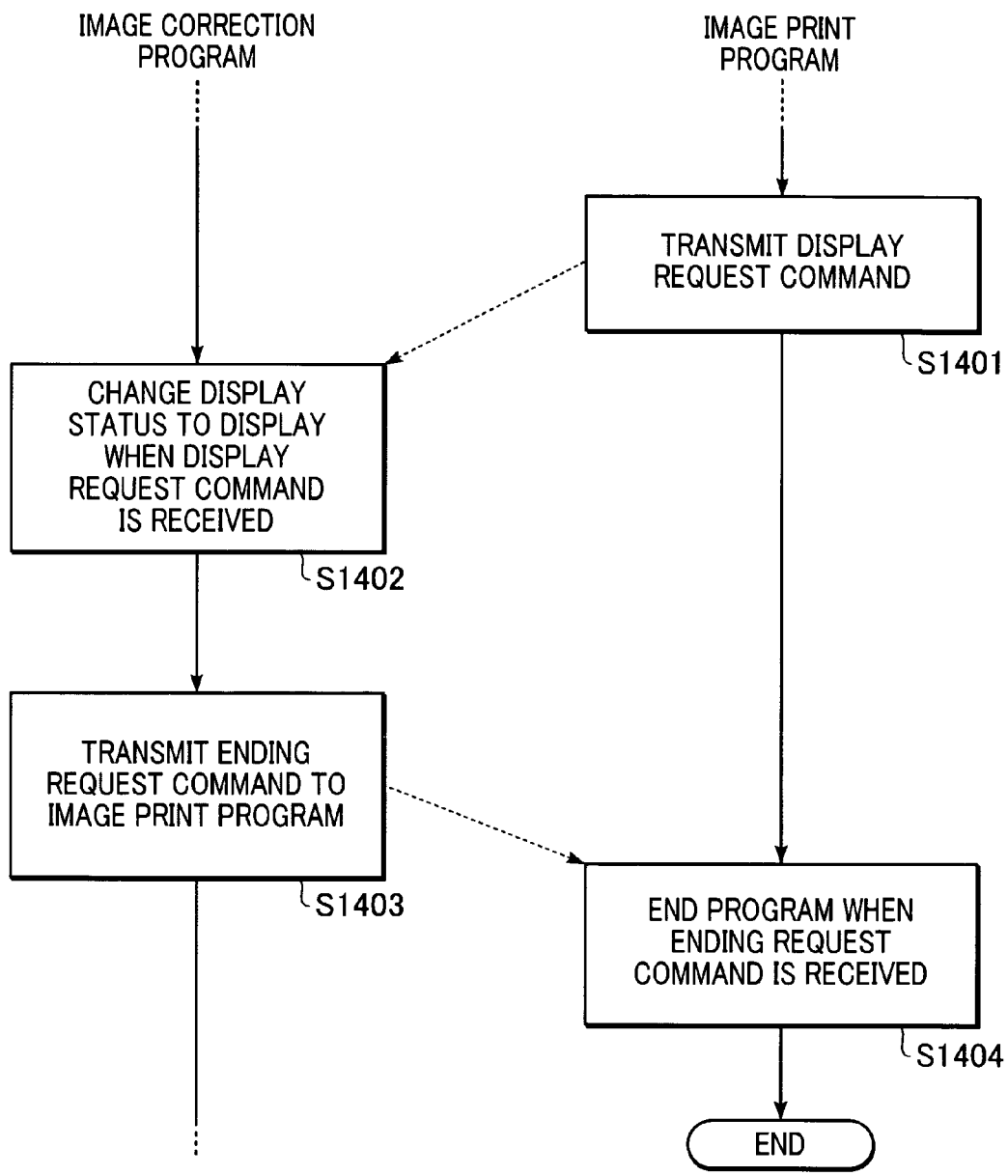

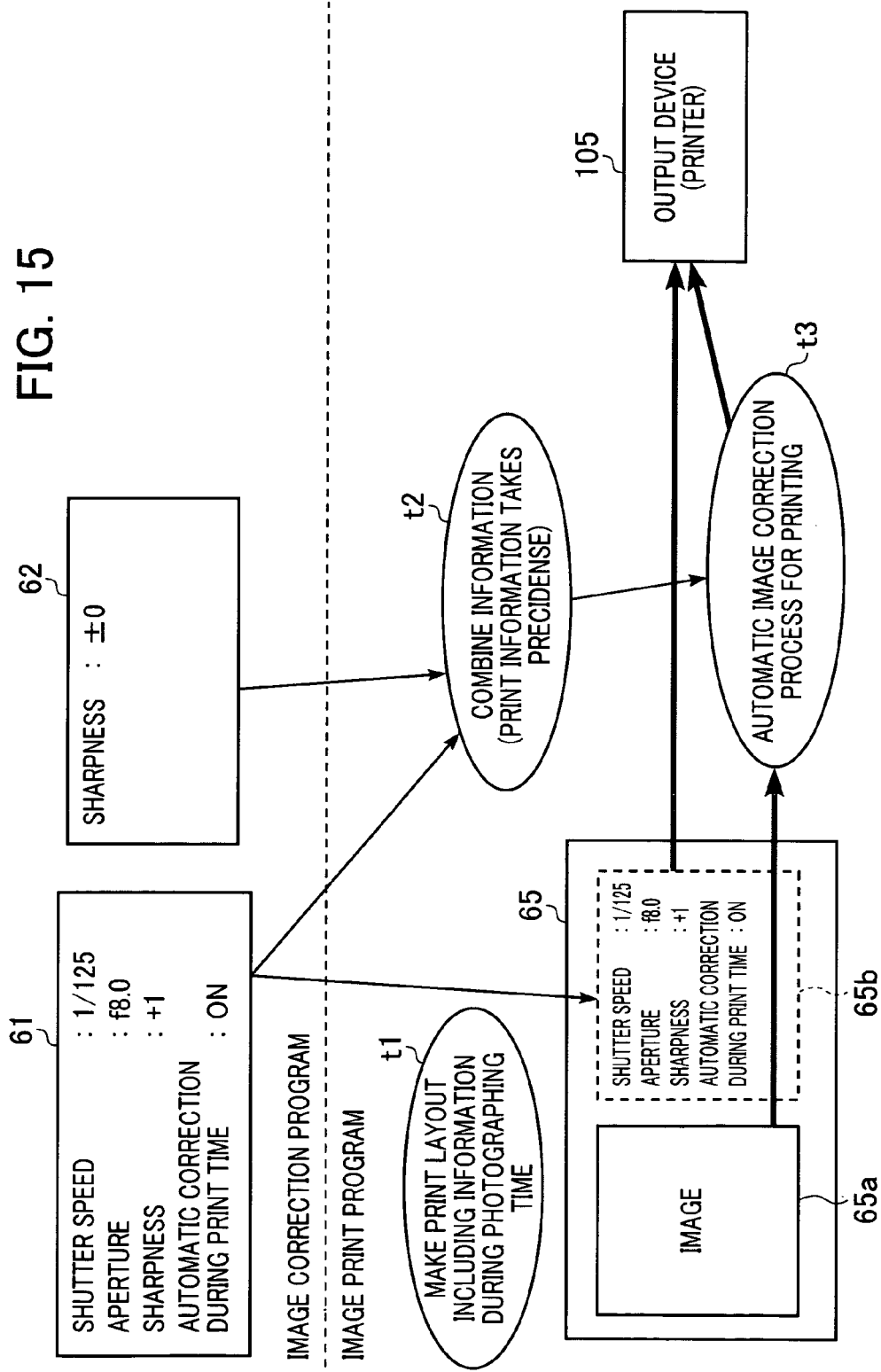

FIG. 16

| STATUS CODE (4 BYTES) |
|---|
| HEADER SIZE (4 BYTES) |
| OFFSET TO IMAGE DATA (4 BYTES) |
| IMAGE DATA SIZE (4 BYTES) |
| OFFSET TO INFORMATION DURING PHOTOGRAPHING TIME (4 BYTES) |
| DATA SIZE OF INFORMATION DURING PHOTOGRAPHING TIME (4 BYTES) |
| OFFSET TO PRINT INFORMATION (4 BYTES) |
| DATA SIZE OF PRINT INFORMATION (4 BYTES) |
| OFFSET TO ICC PROFILE (4 BYTES) |
| DATA SIZE OF ICC PROFILE (4 BYTES) |
| IMAGE DATA |
| INFORMATION DURING PHOTOGRAPHING TIME |
| PRINT INFORMATION |
| ICC PROFILE |

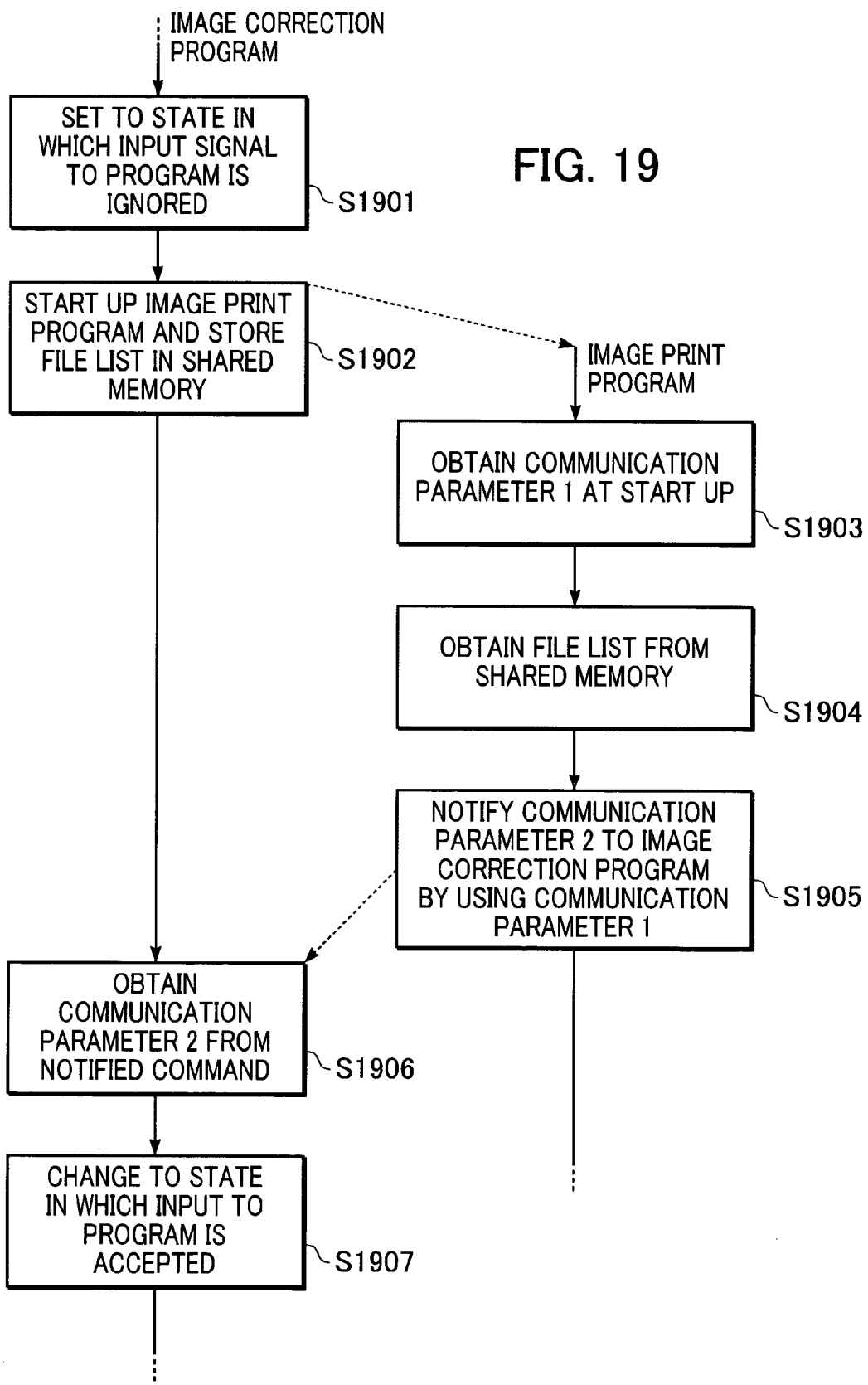

INTER-PROGRAM COMMUNICATION APPARATUS, INTER-PROGRAM COMMUNICATION METHOD, COMPUTER-READABLE RECORDING MEDIUM, AND PROGRAM

CROSS REFERENCE TO RELATED APPLICATIONS

This application claims the benefit of Japanese Application 2003-275713, filed on Jul. 16, 2003, and Japanese Application 2004-150737, filed on May 20, 2004, the entire contents of which are incorporated herein by reference.

BACKGROUND OF THE INVENTION

1. Field of the Invention

The present invention relates to an inter-program communication apparatus in which a plurality of programs that handle a medium object to be processed communicate with one another so as to perform an entire integrated process, an inter-program communication method for use therewith, a computer-readable recording medium, and a program.

2. Description of the Related Art

Hitherto, inter-program communication used to compensate for functions among inter-program communications searches for a particular program having a function that is not provided in another program and completely entrusts the execution of the process to the found program. For example, there is inter-program communication for realizing coordination, in which, when image data in a data format that is not compatible with image print software is to be printed using the image print software, a search for a program capable of handling the image data of that data format is performed, and that program is entrusted with a process so that the image data is decoded into the data format that can be processed by the image print software.

In order to realize the coordination of a plurality of programs such as that described above, it is necessary to search or estimate as to which program should be used to realize functions that are not provided in a particular program. Furthermore, since it is not known what kinds of functions need to be supplemented by performing inter-program communication, the procedure of the inter-program communication becomes complex, and the program must be implemented by taking extra care as to the coordination of programs. For example, it is considered that a program that is different for each application of the coordination destination must be implemented.

However, in conventional inter-program communication, in a particular program, there is a problem in that, in addition to a load of processing for searching for another program that is most appropriate for coordination, for supplementing functions that cannot be processed by the program for itself, the load of processing due to the complexity and strictness for controlling inter-program communication required for coordination is very heavy.

SUMMARY OF THE INVENTION

The present invention has been made in view of the above-described circumstances. An inter-program communication apparatus capable of realizing inter-program communication with a lesser amount of processing load, an inter-program communication method for use therewith, a computer-readable recording medium, and a program are disclosed.

According to an aspect of the present invention, an inter-program communication apparatus for performing inter-program communication between a first program and a second program that are capable of processing a common medium object in a coordinated manner is disclosed. The inter-program communication apparatus comprises: communication path establishment means for establishing a communication path between the first program and the second program; shared-memory allocation means for allocating a memory area of a shared memory shared by the first program and the second program; notification means for communicating specific information for specifying the medium object and request information for requesting a processing of a medium object specified by the specific information from the first program to the second program by using the communication path established by the communication path establishment means; and transfer means for, when the second program performs the processing corresponding to the request information on a medium object specified by the specific information notified by the notification means, transferring data of the medium object body after the processing from the second program to the first program by storing the data of the medium object body and attached information attached to the medium object after the processing in the shared memory allocated by the shared-memory allocation means.

Further features and advantages of the present invention will become apparent from the following description of the preferred embodiments.

BRIEF DESCRIPTION OF THE DRAWINGS

FIG. 12 shows an example of the format of image data and attached information stored in a shared memory.

FIG. 14 is a flowchart showing processing for showing that two programs that operate in a coordinated manner at an ending phase 53 operate as if they were one program in the case of an OS that cannot change the display state of the window which is started up in another process.

FIG. 15 shows processing of information during photographing time in an inter-program communication method according to a second embodiment of the present invention.

FIG. 16 shows an example of the format of image data and attached information stored in a shared memory in the second embodiment of the present invention.

FIG. 19 is a flowchart showing a method of avoiding the ending of a program on the start-up side during a coordination starting process in the first embodiment of the present invention.

DESCRIPTION OF THE EMBODIMENTS

Embodiments of the present invention are described below.

First Embodiment

An overview of a computer system in a first embodiment of the present invention is described first.

Figure 1:
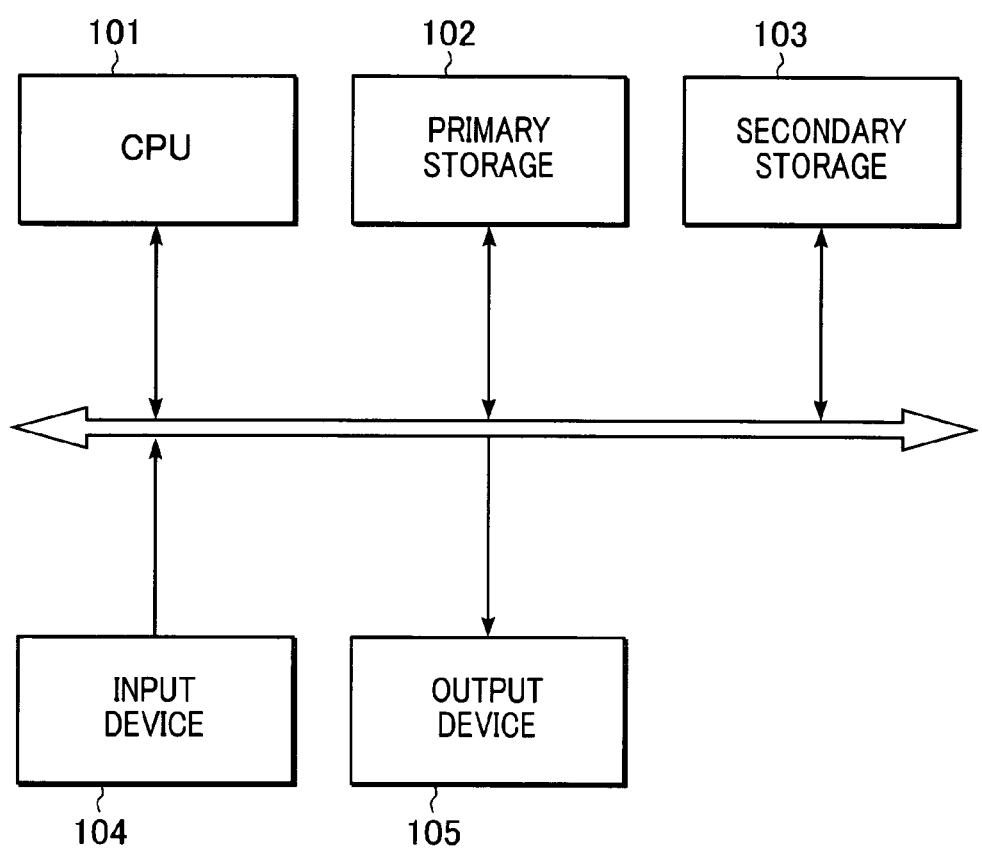
FIG. 1 shows the hardware configuration of a computer system in a first embodiment of the present invention.

FIG. 1 shows an exemplary hardware configuration of a computer system in the first embodiment. In FIG. 1, a CPU 101 controls the operation of the entire system, and executes a program stored in a primary storage 102. The primary storage 102 is mainly a memory in which a program stored in a secondary storage 103 is read and stored. The secondary storage 103 is a non-volatile recording medium, such as a hard disk. In general, the capacity of the primary storage 102 is smaller than the capacity of the secondary storage 103, and the CPU 101 stores, in the secondary storage 103, programs and data, all of which cannot be stored in the primary storage 102. Furthermore, the CPU 101 also stores, in the secondary storage 103, data that needs to be stored for a long period of time.

In this embodiment, various programs are stored in the secondary storage 103, a program to be executed among them is read into the primary storage 102, and the CPU 101 executes the programs. An input device 104 is used for controlling the computer system. An exemplary input device 104 includes a mouse and a keyboard and also, a card reader, a scanner, and a film scanner, which are used for inputting image data. An output device 105 is both a display device and a print device, examples of which include a liquid-crystal monitor and a printer. The above-described hardware configuration of the computer system is only an example, and the present invention is suitably used for an apparatus and a system having a hardware configuration capable of executing a computer program.

In the computer system shown in FIG. 1, an operating system (hereinafter referred to as an "OS") capable of concurrently executing a plurality of programs and various application programs that can operate in the OS are installed, and the CPU 101 can execute the programs. This OS provides an operator of the computer system with a GUI (Graphical User Interface). As a result, it is possible for the operator to use various application programs by operating the GUI from the above-described input device 104. In this embodiment, a computer system in which Windows® is installed as a specific example of the OS will be described. The OS installed in the computer system is not restricted to Windows®, and a computer system in which another OS is installed can be used.

It is assumed here that the computer system has installed therein, as application programs, an image correction program for correcting an image, and an image print program for printing the image corrected by the image correction program. A set-up by which the image correction program and the image print program operate in a coordinated manner by using the inter-program communication method, which is a feature of this embodiment, is described next. The computer system in this embodiment has a mechanism for handling image data using a plurality of programs, and has a function for controlling the coordination of the plurality of programs and inter-program communication for realizing the coordination. The specification of the program itself to be coordinated is not restricted and can be applied to a program having various specifications.

First, a description is given of an image correction program that can be used in the computer system shown in FIG. 1. The image correction program is an image correction application targeting image data in an image file format such as BMP, JPEG, and TIFF as an object to be processed. As a result of the CPU 101 executing the image correction program, an image selection screen 20 or an image correction screen 24, shown in FIG. 2, is displayed on an output device (display device) 105.

Figure 2:
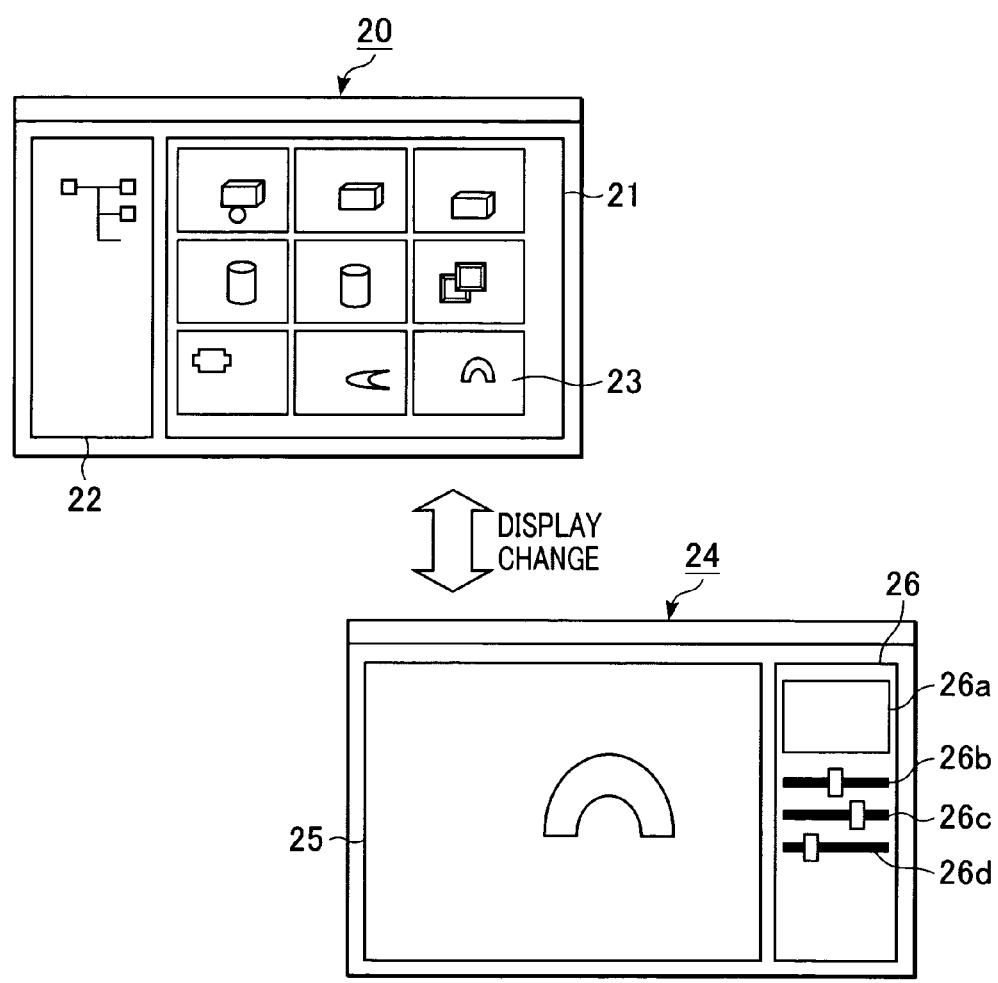
FIG. 2 shows an example of an image selection screen and an example of an image correction screen, which are displayed on an output device 105 by an image correction program.

As shown in FIG. 2, the image selection screen 20 is formed of a folder tree display area 22 and a thumb nail display area 21, and in the folder tree display area 22, a folder tree by which the directory structure of the image data stored in the recording medium of the system is represented is displayed. When the directory displayed in this folder tree display area 22 is selected, in the thumb nail display area 21, reduced images (thumb nails) of images to be selected, which are stored in the selected directory, are displayed in a list form. Here, in the thumb nail display area 21, when the image to be displayed is corrected on the image correction screen 24, the identical correction is also applied to the reduced image in order to make a display. Furthermore, in the thumb nail display area 21, when there are too many object images and all of the reduced images cannot be displayed in the thumb nail display area 21 at the same time, a scroll bar is displayed. This makes it possible for the operator to browse all of the reduced images by operating the scroll bar. The selection state and the non-selection state of the reduced image displayed in the thumb nail display area 21 is switched (toggled) each time a single click is performed, and the display is changed to the image correction screen 24 when a double click is performed. For example, when a reduced image 23 of FIG. 2 is double-clicked, the image correction screen 24 having an image corresponding to the reduced image 23 is displayed.

The image correction screen 24 is formed of an image-to-be-corrected display area 25 and a correction pallet 26. In the image-to-be-corrected display area 25, an image in which parameters specified by the correction pallet 26 are applied to the image to be corrected is displayed. The correction pallet 26 is formed of a histogram display area 26a in which the histogram of an image to be processed is displayed, and sliders 26b to 26d for specifying sharpness, chroma, etc. Each time the operator operates the sliders 26b to 26d, the CPU 101 corrects and updates the image in the image-to-be-corrected display area 25. Examples of the parameters that can be adjusted by the correction pallet 26 include luminance, a γ value, sharpness, chroma, and contrast.

Figure 3:
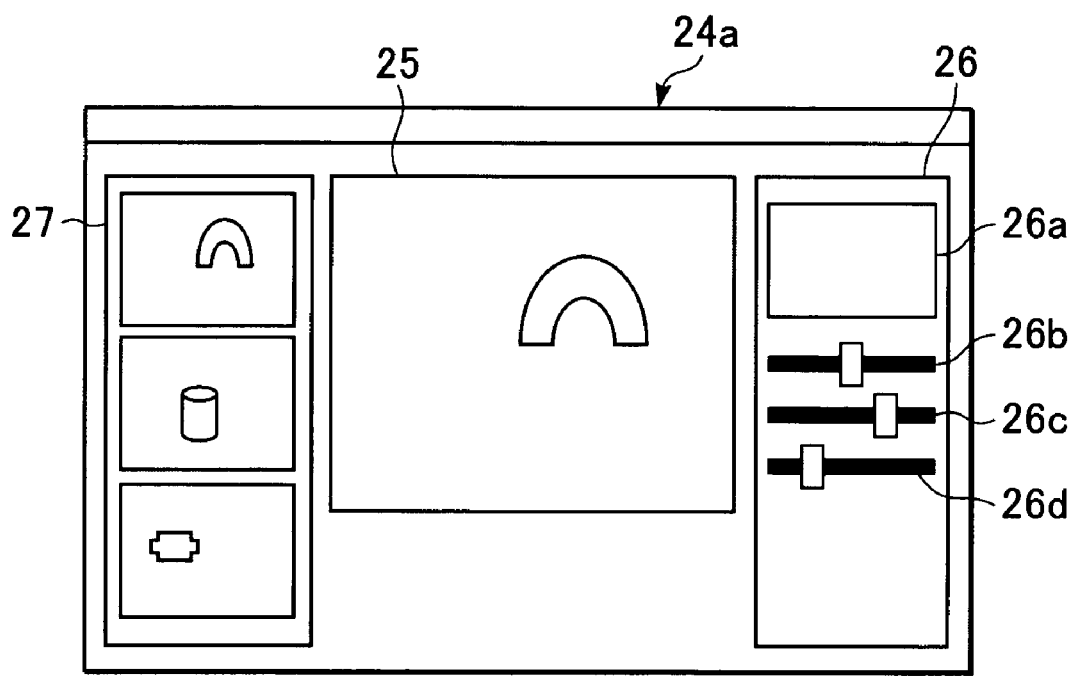
FIG. 3 shows an example of an image correction screen when a plurality of images are selected by an image selection screen 20 of FIG. 2.

A description is further given of an image correction screen differing from the image correction screen 24 shown in FIG. 2. For example, when the operator selects a plurality of images on the image selection screen 20, the CPU 101 displays an image correction screen 24a shown in FIG. 3 on the output device (display device) 105. In the image correction screen 24a, a list-of-selection-images display area 27 is displayed to the left of the image-to-be-corrected display area 25. In this list-of-selection-images display area 27, the reduced images of the selected images are displayed adjacent to each other. As a result of providing a mode for displaying such an image correction screen 24a, when a plurality of images are to be corrected, it is not necessary to perform an operation of changing the display of the image selection screen 20 and the image correction screen 24 in such a manner as to correspond to the number of selected images, and thus the ease of operation is improved.

The correction results in the image correction screen 24 or the image correction screen 24a (hereinafter referred to simply as an "image correction screen 24") are stored in such a manner that the image to be processed is not directly processed, but correction parameters for the original image are additionally described in the file. As a result of the above, even if parameters are changed many times according to corrections, since the image data is stored in the original image, the image quality does not deteriorate each time a correction is performed.

Figure 4:
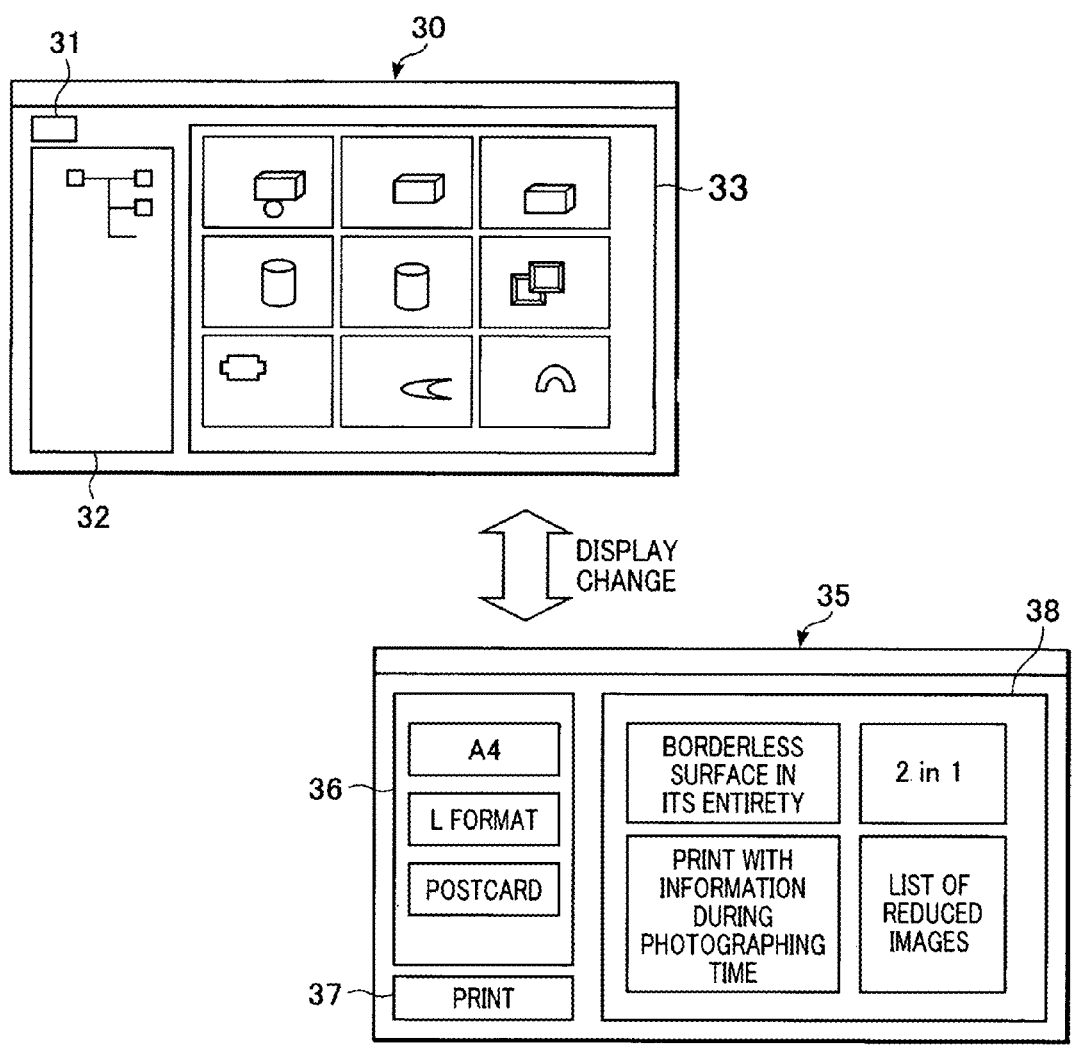
FIG. 4 shows an example of an image selection screen and an example of a print condition setting screen, which are displayed on the output device 105 by an image print program.

A brief description of the image print program is next. The image print program is a print application in which image data in JPEG format is a target. As a result of the CPU 101 executing the image print program, an image selection screen 30 and a print condition setting screen 35, shown in FIG. 4, are displayed on the output device (display device) 105. As shown in FIG. 4, the image selection screen 30 further includes an end button 31 for ending the process performed by the image print program in addition to a folder tree display area 32 and a thumb nail display area 33, which are similar to those of the image selection screen 20 shown in FIG. 2. The print condition setting screen 35 includes a printing-paper specification area 36, a print button 37, and a layout specification area 38. As a result, when the print button 37 is pressed after the printing paper is specified in the printing-paper specification area 36 and the layout is specified in the layout specification area 38, the selected image is output by the output device (printer) 105 in such a manner that it is printed on the printing paper of the specified paper size and in the specified layout.

As shown in FIG. 4, in this embodiment, in the printing-paper specification area 36, one of A4, the L format, and a postcard can be selected. In the printing-paper specification area 36, in addition to the printing-paper size, the type of printing paper may be specified, for example, plain paper, photographic paper, or the like can be specified. In the layout specification area 38, one of the borderless surface in its entirety, 2 in 1, the print with information during photographing time, and a list of reduced images (indexed print) can be selected. Here, the print with information during photographing time is a layout for outputting the image and the attached information thereof (the information during photographing time, such as the photographed date and time, the shutter speed, etc.) on the same printing paper. More specifically, one image and the information during photographing time are output adjacent each other with respect to one piece of paper. When the end button 31 is pressed, the process of the image print program is terminated.

In the foregoing, in addition to the above-described operation as stand-alone, the image correction program and the image print program described with reference to FIGS. 2 and 4 have implemented therein a mechanism by which they operate in a coordinated manner by an inter-program communication process, which is a feature of this embodiment. The detailed processing of the coordinated operation by this inter-program communication process is described later. First, the operation at the GUI level is described below.

In the image correction program, a menu for printing a selected image is provided, and thus a selected image can be printed by selecting an item on the menu. More specifically, by using the user interface provided by the OS, the selected image can be output by a printer. However, since the image print program described with reference to FIG. 4 is installed in the computer system of this embodiment, the image print program rather than the interface provided by the OS is started up.

Furthermore, when the image print program is started up in response to a print request from the image correction program, the folder tree display area 32 within the image selection screen 30 shown in FIG. 4 is not displayed. In the case of this state, in the thumb nail display area 33, images selected by the image correction program are displayed in a list form. Furthermore, the end button 31 is changed to a return button 31. When this end button 31 is pressed, the image print program ends, and control is returned to the image correction program.

However, when the image correction program and the image print program operate in a coordinated manner in the manner described above, the following problems occur. (1) The processible data format differs between the image correction program and the image print program. Furthermore, it is necessary to transmit the presence or absence of the image correction process among the programs. (2) It is necessary to transmit the file name to be handled among the programs.

In order to solve these problems, the computer system in this embodiment realizes the coordination between the image correction program and the image print program by using the inter-program communication method described below. The details of the inter-program communication method are described below.

First, a description is given below of the communication procedure between the programs, that is, the image correction program and the image print program, in the computer system shown in FIG. 1.

Figure 5:
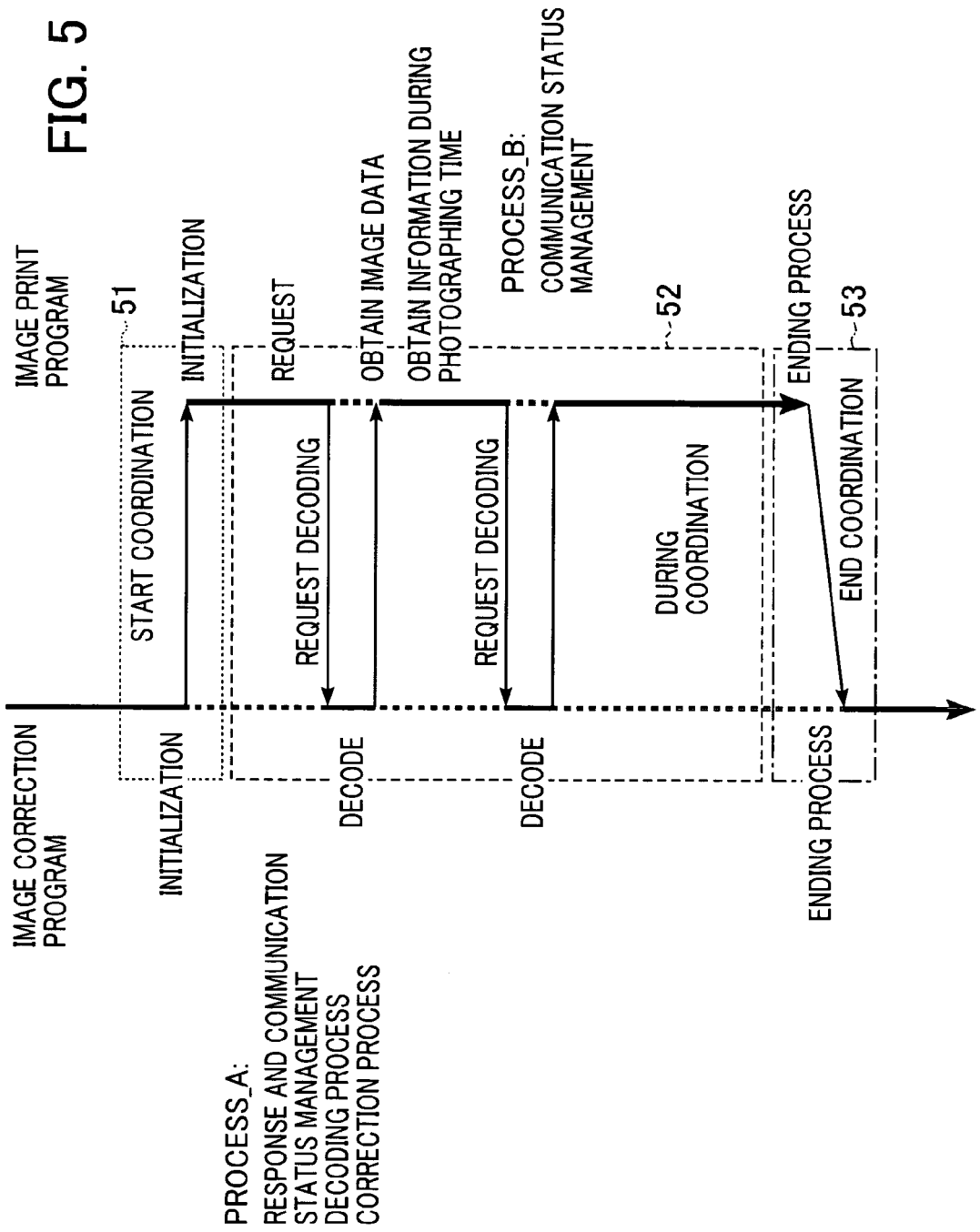
FIG. 5 shows a communication procedure among the programs in the computer system shown in FIG. 1.

FIG. 5 shows the communication procedure between the programs in the computer system shown in FIG. 1. As shown in FIG. 5, this inter-program communication method is broadly made up of three phases: (1) an initialization phase 51, (2) a connection phase 52, and (3) an ending phase 53. A description is given below of the ordinary processing during the three phases among a plurality of programs, including the image correction program and the image print program. The details of the processing of the three phases in the image correction program and the image print program shown in FIG. 5 are described later. In order to facilitate understanding of the description, a program in the middle of processing a certain file is assumed to be a first program, and a program that processes the file in response to a request from the first program by inter-program communication is assumed to be a second program.

Initially, at the initialization phase 51, the first program establishes an inter-program communication path (communication channel) with the second program, and performs a process for sharing a file list, which is a list of files to be processed, by using the communication path. The specification (identification) of a file in each program is by a file number (an identifier or the like may also be used) indicating the sequence in the above-described file list rather than by the file name. That is, each program requests another program to perform processing in units of a file. More specifically, the file number at the beginning of the file list is handled as number 0. Furthermore, the transfer of the file list among the programs is performed through a shared memory. The shared memory is also a memory for storing a file to be processed by each program (a file described in the file list), and is constructed in one of the primary storage 102 and the secondary storage 103 shown in FIG. 1.

When the initialization phase 51 is completed as a result of the above-described processing, the process proceeds to the connection phase 52. At the connection phase 52, the first program notifies the second program of the file number of the file to be processed and the request condition (for example, a request for a decoding process). As a result, the second program performs a process corresponding to the request condition (for example, a decoding process) on the file specified by the file number, and arranges the file after the processing in the shared memory. Next, the first program on the request side refers to the arranged data from the shared memory. As a result of the above, the transfer of necessary data (the file after the decoding process) is realized between the first program and the second program.

When the connection phase 52 is completed, the process proceeds to the ending phase 53. One of the programs notifies the other program of a request for disconnecting the inter-program communication, thus disconnecting the connection. In FIG. 5, the connection of the inter-program communication is disconnected at the same time as the completion of the image print process, and it does not matter which of the programs requests a disconnection. "PROCESS_A" and "PROCESS_B" shown in FIG. 5 are described in the detailed description of a communication protocol (to be described later).

A description is given below of a protocol example of the inter-program communication method in this embodiment, and the details of the processing of each phase between the image correction program and the image print program.

<Communication Protocol>

In this embodiment, as the information for establishing a communication path among the programs, the window handle of the main window displayed as a GUI by each program, and a message ID of the window procedure thereof are used. More specifically, by using the window handle of each of the image selection screen 20 displayed by the image correction program and the image selection screen 30 displayed by the image print program, and the message ID of the window procedure, a communication path is established. "PROCESS_A" and "PROCESS_B" shown in FIG. 5 are communication message IDs defined in the image correction program and the image print program.

When the OS is Windows® as in this embodiment, each window has a window handle by which the window is identified, and an event such as a mouse event is sent with each window handle being specified. In order to identify an event, a message for transmitting an event is assigned with a message ID. The message ID is both a number reserved by the system and a number that can be set as desired by the user. Therefore, by sending an inter-program communication event by defining a communication message ID for inter-program communication as a user-defined message ID and by specifying the window handle in charge of an inter-program communication process, it is possible to transmit information such as a processing request to a specific program that manages the window.

However, in event notification to the window, the amount of transmittable information is limited. When the OS is Windows® as in this embodiment, data that can be provided to the program for managing the window as an event is only WPARAM and LPARAM, which are sub-event information, in addition to the above-described message ID. The WPARAM and LPARAM each accommodate an integer value having a size of 4 bytes. Accordingly, the large-size data, such as image data, is transferred among the programs via the shared memory. In Windows®, the shared memory is managed by assigning an identification name thereto in order to specify the shared memory.

Here, the communication commands used in this embodiment are described below. As has already been described above, a command is transmitted to the program of the other party by using the user-defined message ID (communication message ID). Furthermore, the size of the data that can be used for transmitting a command and parameters is 8 bytes in which the WPARAM and LPARAM are combined. Accordingly, as shown in FIG. 6, the 8 bytes are divided into four portions in units of 2 bytes, and these portions are handled as a command, parameter 1, parameter 2, and parameter 3.

Figures 6, 7:
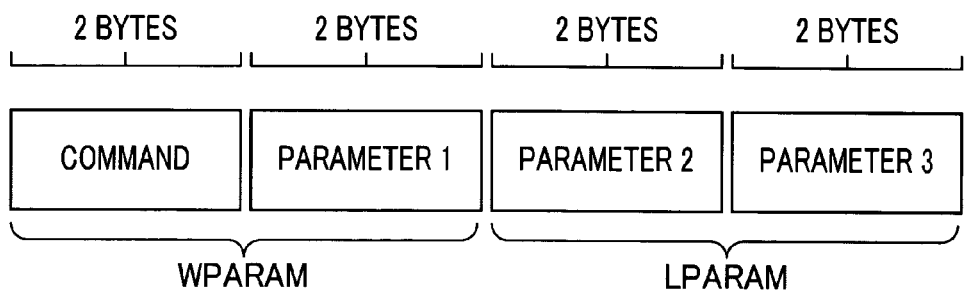
FIG. 6 shows an example in which a command and parameters to be included in the communication message ID in this embodiment are assigned.
FIG. 7 shows a list of examples of definitions corresponding to the higher-order one byte in the command part of FIG. 6.

FIG. 6 shows an example in which a command and parameters to be included in the communication message ID in this embodiment are assigned. In the command part of FIG. 6, a list of examples of definitions corresponding to the higher-order one byte is shown in FIG. 7, and in the lower-order one byte, a command indicating the color depth during decoding is placed. As shown in FIG. 7, "00" to "7F" in hexadecimal indicates a decoding request command; "A0" indicates a message ID notification command; "B0" indicates a window handle notification command; "E0" indicates an inter-program connection communication disconnection request command; and "F0" indicates a program ending request command. The details of each command shown in FIG. 7 are described in the detailed description of the processing at each phase.

A description is given next of the details of the processing at each phase of the initialization phase 51, the connection phase 52, and the ending phase 53 shown in FIG. 5.

<Initialization Phase>

At the initialization phase 51, an inter-program communication starting process is performed as described above. That is, the processing from when the image correction program starts up the image print program which operates in a coordinated manner until the communication path among the programs is established is the initialization phase 51.

In this embodiment, at the initialization phase 51, between the two programs that operate in a coordinated manner, it is necessary to notify the window handle of the window, in which a communication process is implemented, and the message ID with each other. Furthermore, one of the two programs that operate in a coordinated manner needs to allocate a shared memory and to transmit the identification name thereof to the program of the other party. In this embodiment, the shared memory is allocated by the program on the side in which another program is started up. More specifically, as shown in FIG. 5, the image correction program allocates the shared memory and transmits the identification name of the shared memory to the image print program.

Here, the details of the processing of the initialization phase 51 shown in FIG. 5 are described.

Figure 8:
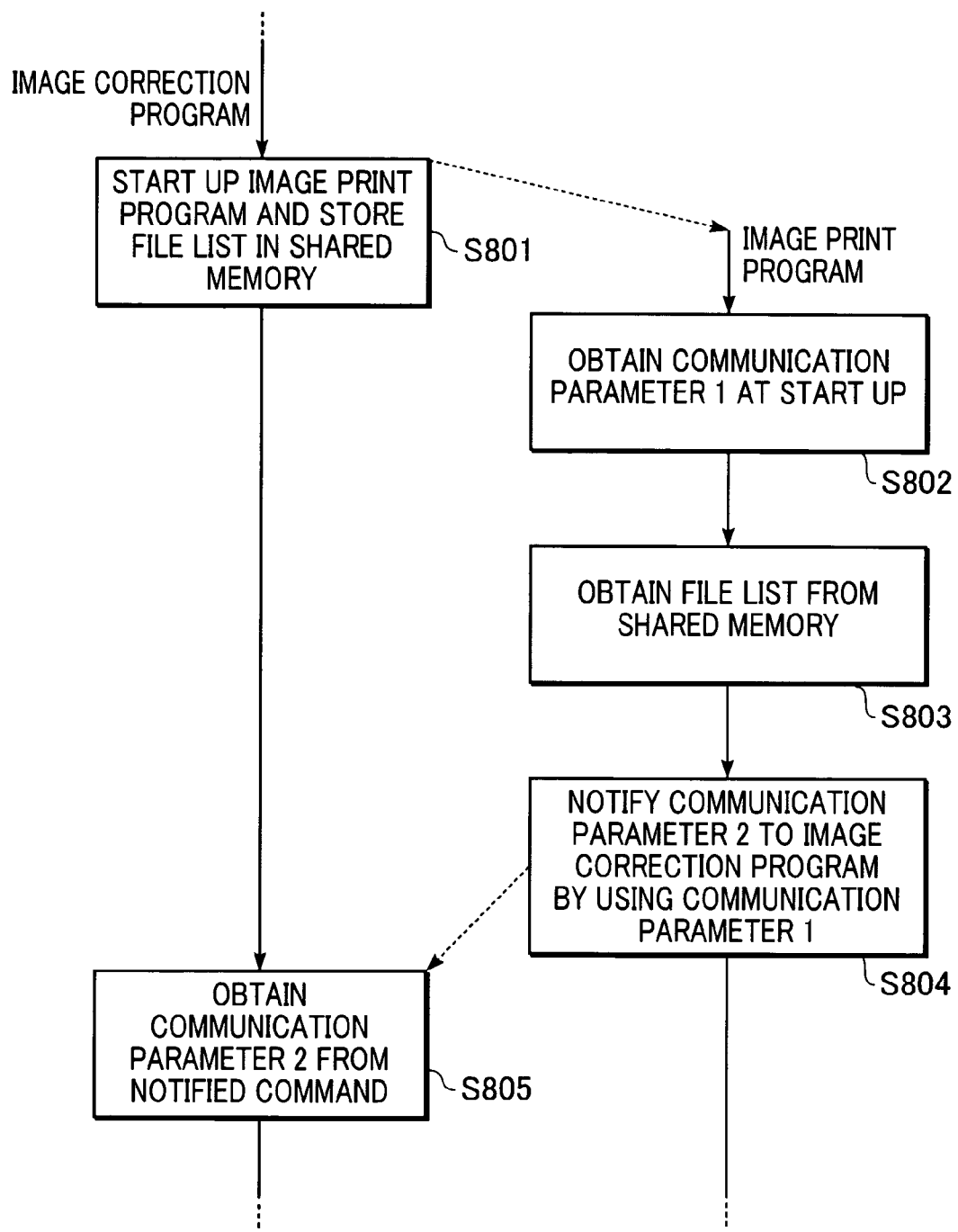
FIG. 8 shows the details of the processing of an initialization phase 51 shown in FIG. 5.

FIG. 8 shows the details of the processing of the initialization phase 51 shown in FIG. 5. The assumption of the processing shown in FIG. 8 is that, in the computer system of this embodiment, the image correction program has already been started up. As shown in FIG. 8, in step S801, the image correction program starts up the image print program and stores the above-described file list in the shared memory. At this time, the image correction program transmits, as the communication parameter 1, the window handle and the message ID which are each formed as a character string by being represented in hexadecimal, and the identification name of the shared memory, which are described in sequence. As a result, it is possible to specify the communication parameter 1 as an execution-time option of the image print program. The image correction program arranges the file list, which is a list of files handled among the programs, in the shared memory.

Next, in step S802, the image print program obtains the communication parameter 1 from the image correction program at the start-up time. As a result, the image print program analyzes the execution-time option (startup-time parameters) specified by the communication parameter 1 in order to obtain the window handle, the message ID, and the identification name of the shared memory of the communication party (image correction program).

When the execution-time option is not particularly specified, it is identified that the image print program is started up as stand-alone, and when the execution-time option is specified, it is identified that the image print program is started up by another program. As a result of performing such processing, as shown in FIG. 4, it becomes possible for the image print program to display the folder tree display area 32 at the start-up time. However, the stand-alone starting-up checking process is omitted in FIG. 8.

Next, in step S803, the image print program obtains the file list in the shared memory by using the identification name of the shared memory, which is obtained in step S802. Next, in step S804, the image print program notifies, as the communication parameter 2, the window handle and the message ID used for inter-program communication on the image print program side, to the image correction program specified by the window handle and the message ID obtained in step S802. More specifically, by using two commands of SEND_MESSAGE_ID and SEND_WINDOW_HANDLE, the image print program notifies the window handle and the message ID as the communication parameter 2 to the image correction program. In the case of the SEND_MESSAGE_ID command, the message ID used for communication is transmitted in the areas of parameter 2 and parameter 3, shown in FIG. 6. Also, in the case of the SEND_WINDOW_HANDLE command, the window handle is notified in the areas of parameter 2 and parameter 3, shown in FIG. 6. In either case, the area of parameter 1 is set not to be in use.

Next, in step S805, the image correction program obtains, as the communication parameter 2, the window handle and the message ID used for inter-program communication in the image print program from the two commands notified in step S804.

As a result of performing the processing described above at the initialization phase 51, the inter-program communication path between the image correction program and the image print program can be established. Furthermore, at the initialization phase 51, as a result of the image correction program and the image print program that operate in a coordinated manner performing window display control shown below, it is possible to cause the user to see that the programs operate as if they were one program. In this manner, showing that two programs are operating as if they were one program produces a sense of unification, and it may be said that this is a natural operation environment for the user.

Figure 9:
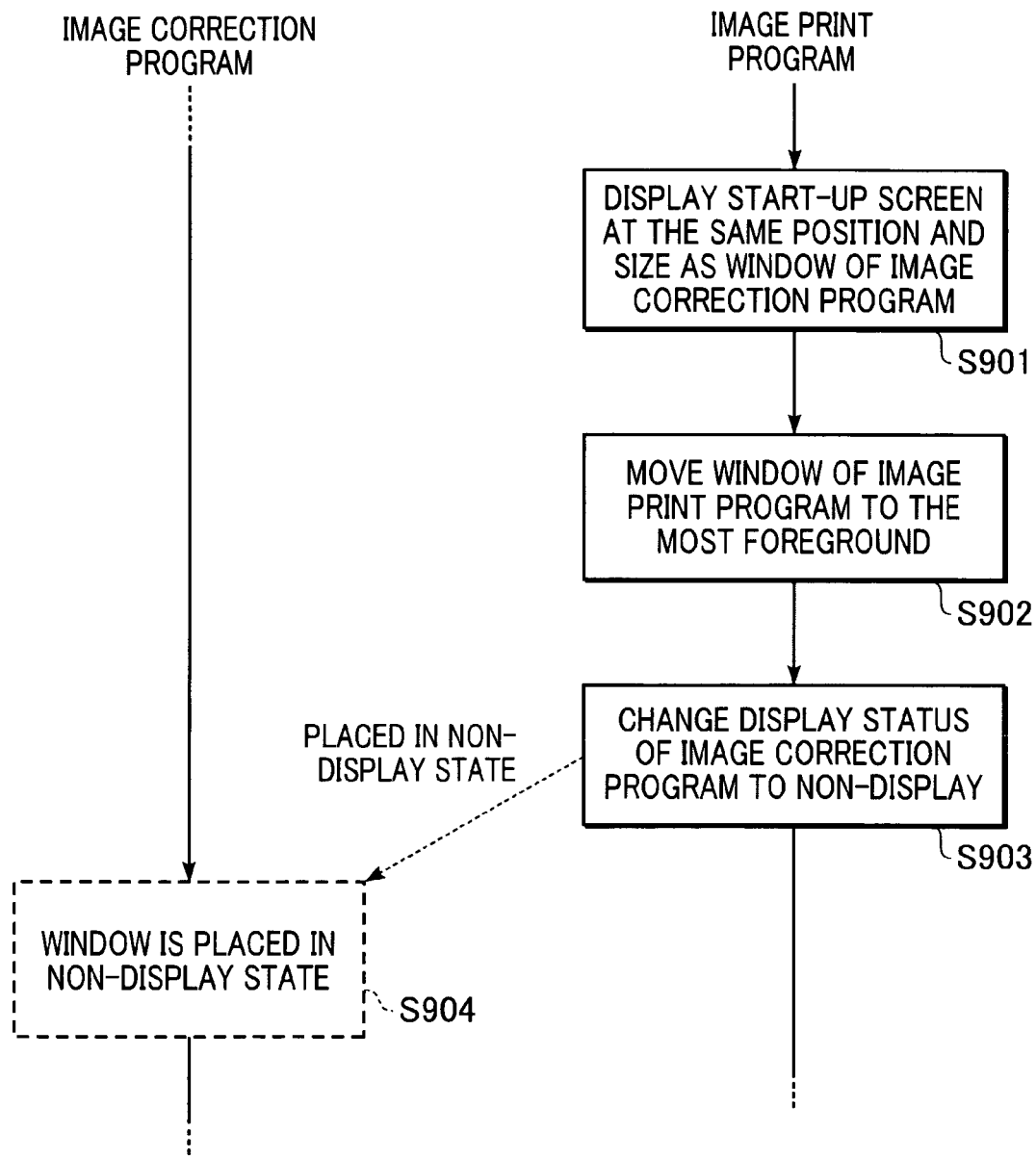
FIG. 9 is a flowchart showing processing for showing that two programs that operate in a coordinated manner at the initialization phase 51 operate as if they were one program.

FIG. 9 is a flowchart showing processing for showing that two programs that operate in a coordinated manner at the initialization phase 51 operate as if they were one program.

As shown in FIG. 9, initially, in step S901, when the start-up screen (window) is to be displayed, the image print program at start-up time displays the start-up screen (window) at the same display position and the same size as those of the window that is originally displayed (hereinafter referred to as an "original window") by the image correction program. In this embodiment, when the image print program is started up from the image correction program, the window in the image print program (for example, the image selection screen 30 of FIG. 4) is displayed on the output device (display device) 105 at the same display position and the same size as those of the original window (for example, the image correction screen 24 of FIG. 2) which is displayed by the image correction program.

Next, the process proceeds to step S902, where the image print program displays the start-up screen (window) displayed in step S901 on the most foreground. As a result, it is possible to cover the original window which is originally displayed by the image correction program. Next, the process proceeds to step S903, where the image print program changes the display state of the window displayed by the image correction program to a non-display state. As a result, in step S904, the original window of the image correction program is placed in a non-display state.

As a result of the above, even if the display position of the start-up screen which is newly displayed is changed, the original window which is originally started up is not displayed, and it becomes possible for the two programs that operate in a coordinated manner to cause the user to merely see that the display mode is simply changed. When the OS is Windows®, as in this embodiment, if the window handle has been obtained, any window can be placed in a non-display state even by another process. Therefore, it is possible to replace the window by the above-described procedure.

Here, in FIG. 8, it is considered that the image correction program ends at the timing of step S802 and before step S805. For example, in Windows®, by simultaneously pressing the ALT key and the F4 key, it is possible to display a menu for closing the specified window. Here, the selection of the ending of the program makes it possible to end the program. As a result of performing such an operation, it is possible to end the program on the start-up side before the coordination between the start-up side and the program that is newly started up is established. As a result of the above, the program is placed in an unexpected state, and this program coordination method cannot be used in a consistent manner.

Therefore, as shown in FIG. 19, in addition to the processing of FIG. 8, by controlling the state of the image correction program to a state in which general key inputs are ignored during the period from when the coordination starts until the coordination is established, the above-described situation can be avoided.

FIG. 19 is a flowchart showing a method of avoiding the ending of a program on the start-up side during a coordination starting process in the first embodiment of the present invention. The processes of steps S1902 to S1906 in FIG. 19 are the same processes as steps S801 to S805 shown in FIG. 8, and accordingly, the descriptions thereof are omitted. As shown in FIG. 19, in step S1901, the image correction program sets the state to a state in which an input signal to the image correction program itself is ignored. Subsequent to step S1906 in which the coordination between the image correction program and the image print program is established, in step S1907, the image correction program changes (returns) from the state in which the input signal is ignored, which is set in step S1901, to the state in which an input signal is accepted.

More specifically, in Windows®, the processes such as steps S1901 and S1907 can be realized by using, for example, an EnableWindow function, and by being set to a disable state in step S1901 and to an enable state in step S1907.

Figure 10:
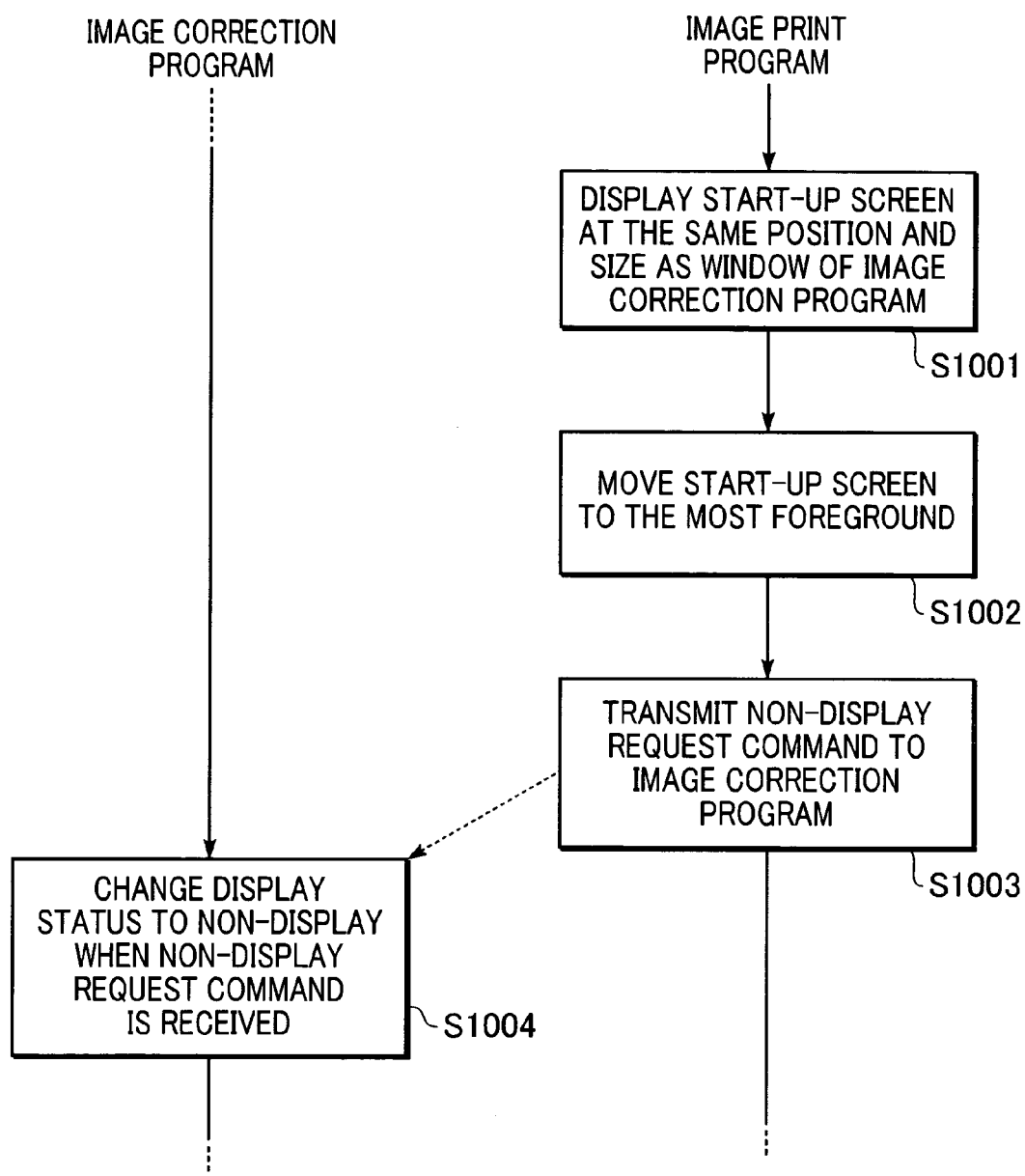
FIG. 10 is a flowchart showing processing for showing that two programs that operate in a coordinated manner at the initialization phase 51 operate as if they were one program in the case of an OS that cannot change the display state of a window which is started up in another process.

In the case of an OS that cannot place the window that is started up in another process in a non-display state, for example, processing shown in FIG. 10 may be performed.

FIG. 10 is a flowchart showing processing for showing that two programs that operate in a coordinated manner at the initialization phase 51 operate as if they were one program in the case of an OS that cannot change the display state of a window that is started up in another process.

In FIG. 10, the processes of steps S1001 and S1002 are the same processes as steps S901 and S902 shown in FIG. 9, and accordingly, the descriptions thereof are omitted. Next, in step S1003, the image print program sends a "non-display request command" to the image correction program of the other party. Next, in step S1004, the image correction program receiving the non-display request command places the original window in a non-display state.

As described in the foregoing, at the initialization phase 51, the image correction program establishes an inter-program communication path with the image print program, and performs a process of sharing a file list, which is a list of files to be processed, by using the communication path. At this time, by controlling the position and the size of the window displayed by the image print program, the coordinated operation of the image correction program and the image print program can be seen operating as if they were one program. In this manner, showing that two programs are operating as if they were one program produces a sense of unification, and it may be said that this is a natural operation environment for the user.

A description is given next of the details of the processing of the connection phase 52 shown in FIG. 5.

<Connection Phase>

The connection phase 52 is a phase in which, in a state in which the inter-program communication between the image correction program and the image print program is established, a request for necessary data (for example, image data) and a transfer thereof are performed.

In this embodiment, the request for necessary image data is performed using the DECODE command among the commands shown in FIG. 7. The feature of the inter-program communication method in this embodiment is that information of the necessary image is transmitted when decoding is requested. For example, in this embodiment, the color depth of the image, the image size (width, height), and the color space are specified when decoding is requested. As shown in FIG. 6, since the data length of the parameter that can be notified together with the command is limited, the specification of the color depth and the color space is provided as the value of the DECODE command shown in FIG. 7. More specifically, the value of the decoding request command takes a value between 0x00 to 0x7F, inclusive, and the color depth of the image to be requested is specified by the lower-order 4 bits of this value. For example, if "8" (a decimal number) is specified by the lower-order 4 bits, data of 8 bits is requested for each RGB color. However, when the lower-order 4 bits is 0000b (b indicates a binary number), it is specified that the image data body is not requested. In this case, only the attached information such as the information during photographing time is requested by the decoding request command.

Next, the higher-order 4 bits of the DECODE command are described. The higher-order 2 bits of the higher-order 4 bits are always 00b, and the color space is specified by the lower-order 2 bits. For example, in this embodiment, 00b indicates sRGB, 01b indicates AdobeRGB, 10b indicates WideRGB, and 11b indicates another color space. The case in which the lower-order 2 bits is 11b indicates that data to which the ICC profile is given is requested together with the image data.

Furthermore, parameter 1, shown in FIG. 6, which is attached to the DECODE command is used to specify the file name. The file name is specified by the number of the file list shared at the initialization phase 51 in the manner described above. Therefore, the upper limit of the number of files that can be shared at a time is 65536 (for the amount of 2 bytes). Furthermore, in parameter 2 of FIG. 6, the image width of the image data is specified in units of pixels. In parameter 3 of FIG. 6, the image height of the image data is specified in units of pixels. As a result of using such a communication message composed of a command and parameters, the information of the required image can be transmitted while specifying the necessary image file.

In addition, the process when image data is requested at the connection phase 52 also has the feature of this inter-program communication method.

Figure 11:
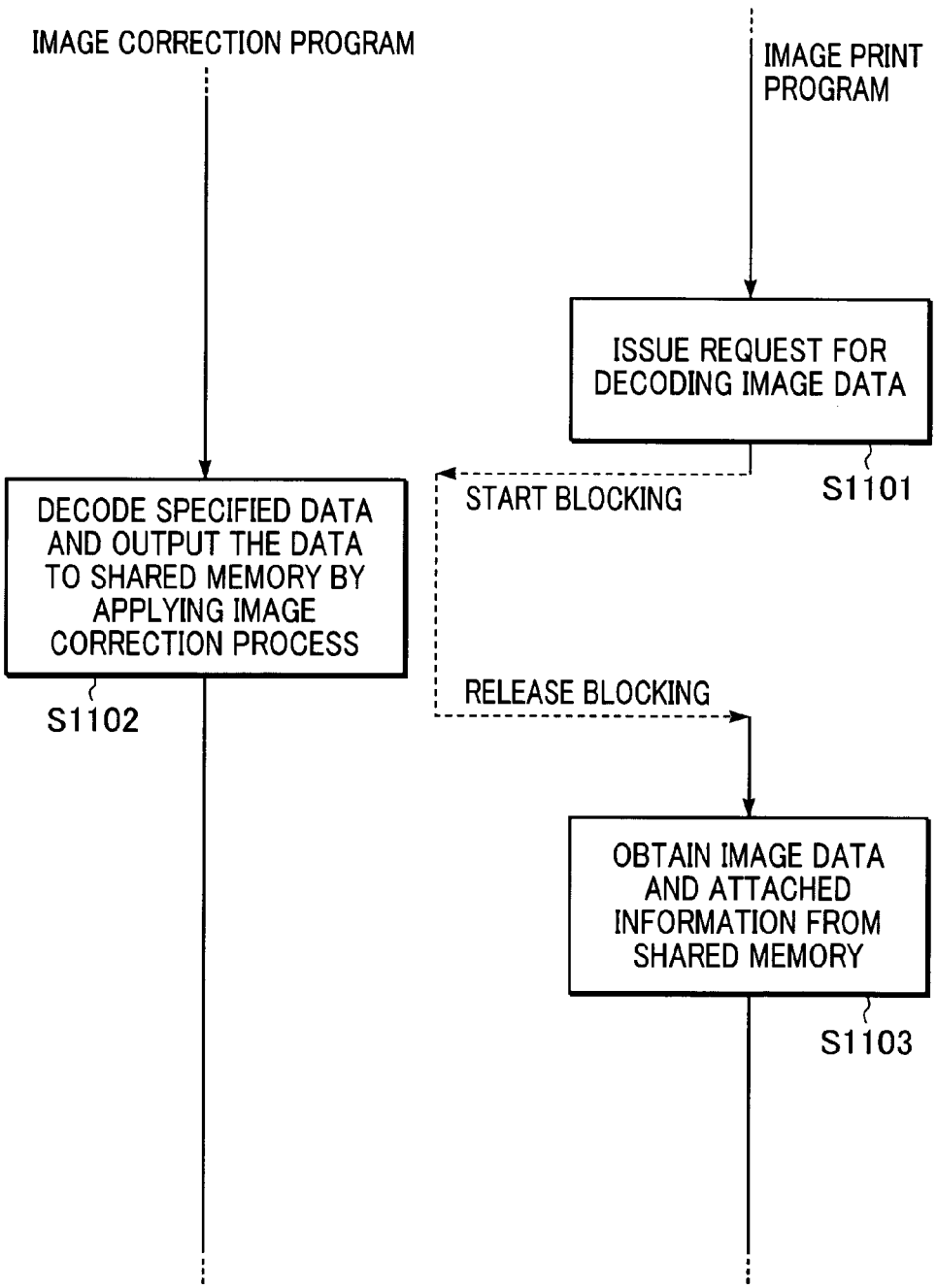
FIG. 11 is a flowchart showing processing when image data is requested at a connection phase 52.

FIG. 11 is a flowchart showing processing when image data is requested at the connection phase 52.

As shown in FIG. 11, initially, in step S1101, the image print program sends a decoding request to the image correction program of the other party. More specifically, the image print program sends the decoding request command DECODE to the image correction program of the other party. At this point in time, the operation of the image print program is blocked. Furthermore, the image print program locks the shared memory.

Here, locking the shared memory means blocking the access to the shared memory from within the same program, and when the image print program is a multi-thread program, the collision of accesses to the shared memory can be prevented. When the image print program is a single thread program, this process can be omitted.

Next, in step S1102, the image correction program receiving the decoding request arranges the image data and the attached information thereof in the shared memory. When data to be arranged in the shared memory does not exist in the memory managed by the image correction program, the image correction program decodes the image data, performs a process for applying a correction process thereon, and arranges the image data after the decoding and correction processes in the shared memory. This completes the process for the inter-program communication message, and the process returns to the message loop. At this point in time, the image print program blocked in step S1101 is released. Next, in step S1103, the image print program extracts the image data and the attached information for which decoding is requested, and thereafter, releases the locking of the shared memory.

In step S1101 (described above), the image print program that has output the decoding request is blocked, but the blocking is not limited to this. In an environment where a thread can be used as the process of the image print program, the operation of the thread that has output the decoding request is blocked. For operating in this manner, when, for example, the OS is Windows®, the above operation can be realized by transmitting the DECODE command by using a SendMessage function provided by the system. That is, when a message is sent using the SendMessage function, the specification of the OS is such that the SendMessage function is blocked until the process for the message is completed.

As a result of operating in this manner, the process for requesting image data from the image print program to the image correction program behaves as if this was one function. If each program operates non-synchronously rather than operating synchronously in the manner described above, the program requesting the image must care about whether or not the image data has been completely transferred to the shared memory each time an image is requested, and the operation of the program is likely to be complex. Furthermore, the program for which an image is requested needs to be implemented by always being conscious about whether the data may be transferred to the shared memory. For the above reasons, by causing the process for transferring image data among the programs to operate completely synchronously, the implementation cost of the program can be greatly reduced.

When the decoding of the image is requested in step S1101, request conditions such as the image size and the color space are specified by the decoding request command and the parameters thereof in the manner described above. However, it is not known whether or not the requested side can generate image data after decoding under the request conditions. Therefore, in the inter-program communication method in this embodiment, the above-described request conditions are handled only as reference information during the image generation process after decoding and correction in step S1102. That is, it does not matter that the image print program generates optimum image data by using the request conditions for the purpose of a higher speed of the image processing and the coordinated operation with the image print program. Conversely, it does not matter that the image correction program generates image data by completely ignoring the request conditions. For this reason, when the image correction program generates image data in which some or all of the request conditions are ignored, the image print program on the side where the decoding request has been made needs to convert the image data obtained from the shared memory to the expected size and color by its own program. If a color management function is not provided in the image print program, the color of the image to be displayed is not accurate, but this can be assumed to be the specification of the image print program.

As described in the foregoing, as a result of two programs performing a "loose" coordination operation in which they do not force request conditions to each other, use or non-use of the functions possessed by the mutual programs becomes possible. This means that the concentration of the coordination of programs can be changed dynamically according to the program operation environment and the program specification itself. The inter-program communication method in this embodiment in which such a "loose" coordination operation among the programs is realized is a very effective communication method. Furthermore, as shown in FIG. 5, a plurality of decoding requests may be output from the image print program to the image correction program. In this case, the processing shown in FIG. 11 is performed multiple times.

The data obtained from the shared memory by the image print program in step S1103 is both the image data and the attached information. Examples of this attached information include information during photographing time and an ICC (International Color Consortium®) profile. For example, when the color space is other than sRGB, AdobeRGB, or WideRGB, the ICC profile is transferred together with the image data. When the color space is sRGB, AdobeRGB, or WideRGB, the color space information is stored in the information during photographing time. As a result of the above, even when the color space to be requested differs from the color space of the generated image data, correct color space information can be transmitted. Furthermore, the image data transferred via the shared memory is assumed to have a DIB (Device Independent Bitmap) format. The DIB format is the standard data format of Windows® and has the advantage in that the received data can be used as is for drawings.

A description is given next of format examples of the image data and the attached information to be stored in the shared memory.

FIG. 12 shows an example of the format of image data and attached information stored in a shared memory. As shown in FIG. 12, an offset to each data and the data size are stored at the beginning of the shared memory, and by referring to this, it becomes possible for each program to access the necessary data. The offset to each data is the number of bytes from the beginning of the shared memory to the start of the data. The case in which the data size is 0 indicates that the corresponding data is not stored. The "status code" shown in FIG. 12 is always 0 in this embodiment. The "header size" in the format example of FIG. 12 is the offsets and the data sizes of the image data, the information during photographing time, and the ICC profile, and has a total of 24 bytes. After the offsets and the data sizes, the area in which the image data itself is stored, the area in which the information during photographing time is stored, and the area in which the ICC profile is stored follow.

A description is given next of the details of the processing of the ending phase 53 shown in FIG. 5.

<Ending Phase>

The ending phase 53 shown in FIG. 5 is a phase in which the connection of the inter-program communication is disconnected in the manner described above. In this embodiment, this process is started as a result of pressing the "return" button 31 on the image selection screen 30, shown in FIG. 4, which is displayed by the image print program. When the OS is Windows®, the "close window" button provided in the upper right portion of the window allows the program for displaying the window to end.

In this embodiment, when the "return" button 31 is pressed, the image print program ends, and control is returned to the image correction program. However, when the "close window" button is pressed, both the image correction program and the image print program are completed. As a result of operating in this manner, when the two programs operate in a coordinated manner, it is possible to allow a user to operate as if they were operating completely as one application program. Showing that two programs are operating as if they were one program in this manner produces a sense of unification, and it may be said that this is a natural operation environment for the user.

More specifically, in this embodiment, for the process among the programs when the "return" button 31 is pressed by the user, the command END_PROCESS shown in FIG. 7 is used as the command for ending only the started-up image print program. The image correction program receiving this command simply ends only the inter-program communication process with the image print program. Furthermore, for the process when the "close window" button is pressed in this embodiment, the command END_PARENT shown in FIG. 7 is used as the command for ending both the programs. The image correction program receiving this command immediately performs a process for ending its own program, completing the program.

Figure 13:
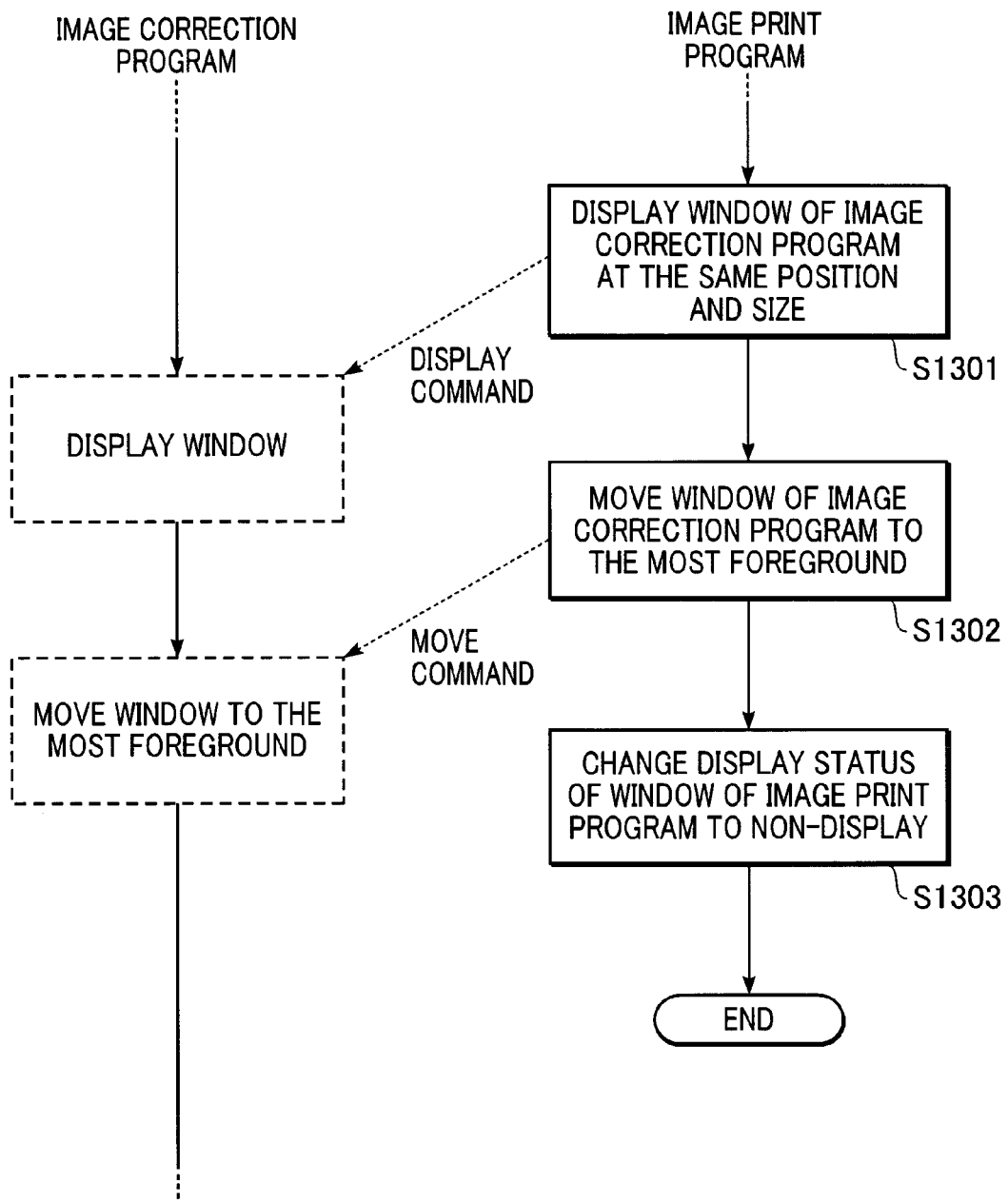
FIG. 13 shows processing for returning the window of the image correction program to the display state when the image print program ends.

More specifically, when the "return" button 31 is pressed, the process shown in FIG. 13 is performed. When the "close window" button is pressed, the image print program transmits the END_PARENT command to the image correction program, completing the program. Upon receiving the END_PARENT command, the two programs are so specified that they immediately perform the process for ending the program.

Furthermore, at the time when the "return" button 31 is pressed as described above, the window of the image correction program operating in a coordinated manner is placed in a non-display state. Therefore, when the END_PROCESS command is issued, the window of the image correction program is returned to the display state.

A description is given below of a process for returning the window of the image correction program to the display state when the image print program ends.

FIG. 13 shows processing for returning the window of the image correction program to the display state when the image print program ends.

As shown in FIG. 13, in step S1301, the image print program causes the original window of the image correction program which has been originally started up to be displayed at the same display position and size as those of the window (image selection screen 30) of the image print program which has been started up later. As a result, the original window of the image correction program is displayed at the same display position and the same the same size as those of the window of the image print program. Next, in step S1302, the image print program causes the original window of the image print program displayed in step S1301 to be displayed on the most foreground. As a result, the original window of the image correction program is displayed on the foreground to the window of the image print program. As a result of the above, the window of the image print program which has been started up later can be covered.

Next, in step S1303, the image print program changes the display state of the window of the image print program to a non-display state. This causes the window of the image print program to be placed in a non-display state. Furthermore, after the window is placed in a non-display state, the image print program ends.

As a result of performing such processing, it becomes possible to cause the user to see that, rather than being switched to a different program, the mode is changed only in the same program. In this manner, showing that two programs are operating as if they were one program produces a sense of unification, and it may be said that this is a natural operation environment for the user. Similarly to that during the initialization phase 51, in the case of an OS that cannot change the display state of another process, the processing shown in FIG. 14 is performed instead of the processing of FIG. 13.

FIG. 14 is a flowchart showing processing for showing that two programs that operate in a coordinated manner at an ending phase 53 operate as if they were one program in the case of an OS that cannot change the display state of the window which is started up in another process. As shown in FIG. 14, initially, in step S1401, the image print program transmits a display request command to the image correction program that has been originally started up. Next, in step S1402, the image correction program receiving the display request command causes the display position and the size of the window to change to the same position and size as those of the communication party (the image print program), and thereafter, changes its own window to the display status. At the same time, the window is moved to the most foreground.

Next, in step S1403, the image correction program transmits an ending request command to the image print program, which is a communication party. Next, in step S1404, the image print program receiving the ending request command changes the display state of its own window to a non-display state, and thereafter, performs a process of ending its own program, completing the program.

As described in the foregoing, in this embodiment, the specification is such that, by controlling the display state of the window, the user is caused to see that the display is changed in the same program, but this specification may be omitted. Furthermore, both the first program and the second program may operate at different apparatuses which are connected over a network.

Second Embodiment

In the inter-program communication method described in the first embodiment, the construction is formed in such a way that the image data and the information during photographing time are transferred among the programs. In comparison, in the inter-program communication method of the second embodiment, the construction is formed in such a way that, in addition to the image data and the information during photographing time, printing correction information (hereinafter referred to as "printing information") is also transferred among the programs. The hardware configuration of the computer system in the second embodiment is identical to the hardware configuration of the computer system in the first embodiment shown in FIG. 1, and accordingly, a description thereof is omitted.

There is a standard called "Exif (Exchangeable image file format) 2.2 (Exif-Print)". This is a standard regarding automatic correction of an image using information during photographing time. In the above-described first embodiment, image correction during printing time is not performed, but in the image print program of this embodiment, an image to be printed is automatically corrected by the information during photographing time. Such an automatic correction process for printing allows the most appropriate print to be provided according to the photographing situation. Since the automatic correction process for printing is a known technology, a description thereof is omitted.

When the image correction program and the image print program operate in a coordinated manner as in the first embodiment, it is preferable that the automatic correction process for printing in the image print program be controlled on the image correction program side. The reason for this is that the correction applied by the image correction program and the automatic correction process for printing influence each other, and an unexpected output result can occur. However, when the information during photographing time is to be printed together with the image, it is not preferable that the information during photographing time is corrected on the image correction program side. Therefore, as shown in FIG. 15, the image correction program of this embodiment sends to the image print program, as the information during photographing time, original information 61 during photographing time and printing information 62, which is information of the difference between the original information 61 during photographing time and the information during photographing time corrected for the automatic correction process during printing time (hereinafter referred to as "printing information during photographing time").

FIG. 15 shows processing of information during photographing time in an inter-program communication method of the second embodiment. In the example of FIG. 15, the sharpness of the original information 61 during photographing time is adjusted as the printing information during photographing time on the image correction program side, and therefore, the printing information 62, which is difference information therewith, includes only the parameter for the sharpness. As shown in FIG. 15, as the information during photographing time, information on the value of the shutter speed, the aperture value (the f value), the sharpness value (±), and the on/off state of the automatic correction during printing time is included.

Furthermore, as shown in FIG. 15, on the image print program side, in process t1, a print layout 65 with information during photographing time, in which an image 65a and information 65b during photographing time that uses the original information 61 during photographing time are arranged adjacent each other, is created. Next, in process t2, the image print program creates printing information during photographing time such that the printing information 62 is overwritten on the original information 61 during photographing time so as to be combined. Next, in process t3, the image print program performs an automatic correction process for printing on the image 65a on the basis of the printing information during photographing time. As a result of the above, printed matter of the print layout 65 shown in FIG. 15 is output from the output device (printer) 105. Furthermore, the image of the printed matter is such that it is corrected by the image correction program, and the automatic correction process for printing in which that correction is taken into consideration is performed thereon.

As a result of performing such processing, when the information during photographing time is to be printed together with the image, the automatic correction result during printing time can be controlled from the image correction program side with the information during photographing time to be printed being kept as the original, and thus the optimum printed matter can be obtained.

Furthermore, although, in the first embodiment, the data allocation in the shared memory when an image is requested is as shown in FIG. 12, in this embodiment, the data is allocated as shown in FIG. 16. When compared to the example of FIG. 12, the header size of the example shown in FIG. 16 is 32 bytes because "offset to print information" and "data size of print information", which are each 4 bytes, are included in the header part.

In the inter-program communication method in this embodiment, on the image correction program side, it can be set so that the automatic correction process for printing is prohibited, and it can also be set so that the automatic correction process for printing is performed in a state in which the information during photographing time is rewritten according to the image correction content. Here, in the inter-program communication method of this embodiment, in addition to the image data and the information during photographing time, the correction information for printing (hereinafter referred to as "printing information") is also transferred among the programs. Alternatively, a configuration in which full resolution information is applied as another information to be transferred among the programs may also be used. The transfer of this full resolution information results from the request such that, if the size when the current image is developed is not desired to be changed freely, the information is desired to be sent back as is.

Third Embodiment

In the first embodiment, the process when the size of the shared memory for transferring a large amount of data among the programs is smaller than the size of the data to be transferred is not mentioned. In the inter-program communication method in the third embodiment, a configuration in which a process for re-allocating a shared memory can be used to deal with such a case is provided. More specifically, in the third embodiment, by using the status code, which is always "0" in the first embodiment, the shared memory re-allocation process is performed. When the shared memory is insufficient, the shared memory is re-allocated by the procedure shown in FIG. 17.

Figure 17:
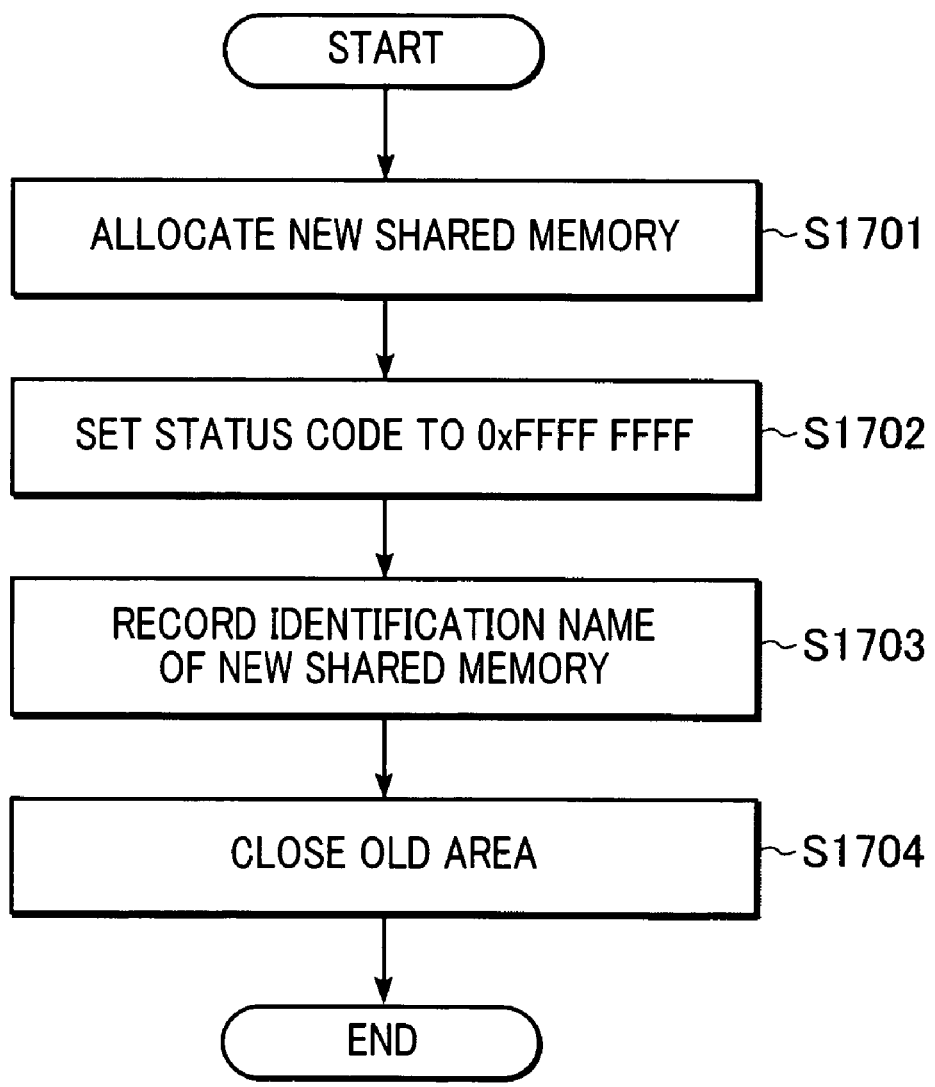
FIG. 17 shows processing for re-allocating a shared memory used in an inter-program communication method according to a third embodiment of the present invention.

FIG. 17 shows processing for re-allocating a shared memory used in the inter-program communication method in the third embodiment. As shown in FIG. 17, initially, in step S1701, the program on the side where data is transferred (hereinafter referred to simply as a "program") allocates a new shared memory area. The identification name of the shared memory is set so as to be 24 bytes or smaller. Furthermore, the identification name is null-terminated. That is, the end of the identification name is always 0x00. Next, the process proceeds to step S1702, where the program stores 0xFFFFFFFF in the initial 4 bytes (status code) of the old area. Usually, after this code, data shown in FIGS. 12 and 16 follow, and when the status code is 0xFFFFFFFF, the identification name of the new shared memory is stored. Next, the process proceeds to step S1703, where the program allocates an area of a new shared memory and records the identification name. Next, the process proceeds to step S1704, where the program closes the area of the old shared memory. As a result of the above, the process of re-allocating the shared memory is completed. After the above-described shared memory re-allocation process, the program stores data to be transferred in the new shared memory.

A description will now be given below of a process of a program on the reading side (side to which data is transferred) (hereinafter referred to as a "reading side program"). When the data of the shared memory is to be read, in the first and second embodiments, the status code is not particularly checked. However, in this embodiment, the status code is checked to confirm whether or not the new shared memory is allocated.

Figure 18:
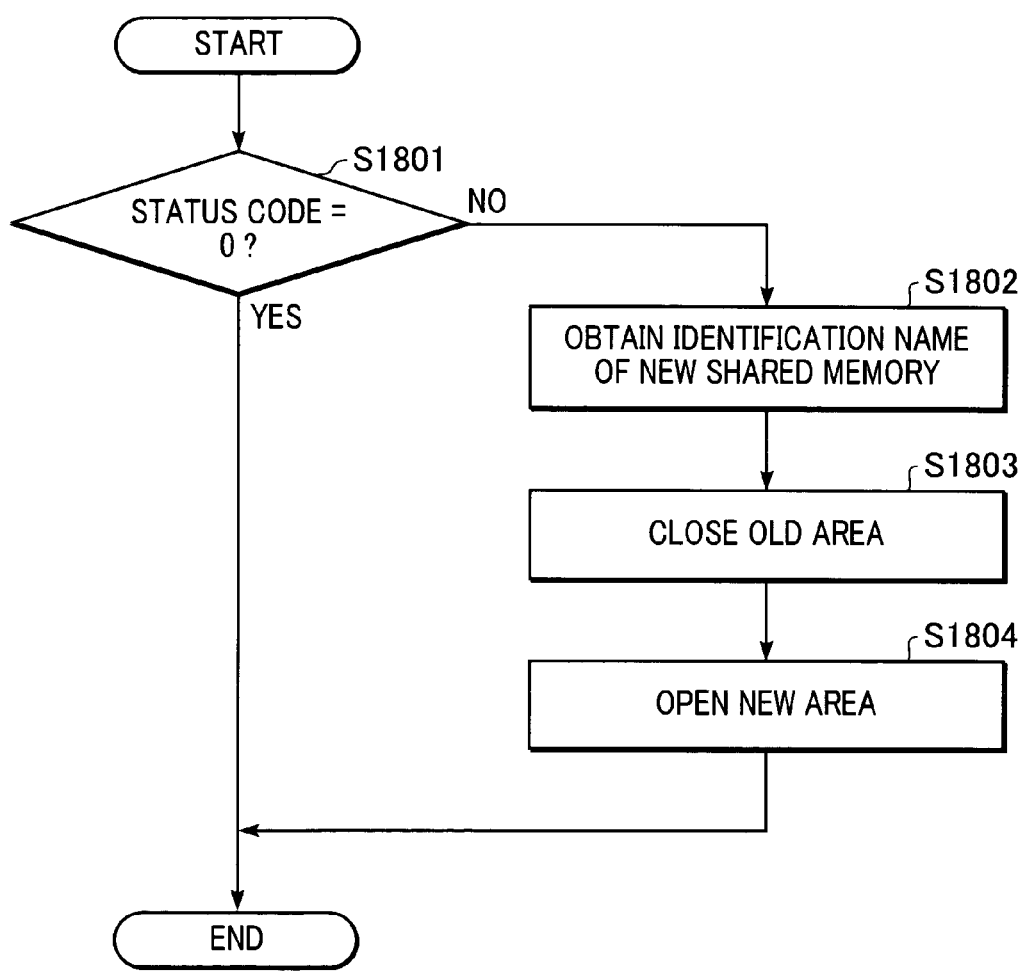
FIG. 18 is a flowchart showing processing of starting to use a new shared memory in a program on the reading side.

FIG. 18 is a flowchart showing processing for starting to use a new shared memory in a reading side program.

Initially, in step S1801, the reading side program checks the status code of the shared memory. When the status code is 0 (YES in step S1801), this indicates that a new shared memory is not re-allocated, and the reading side program ends the processing of starting to use a new shared memory. When the status code is not 0, for example, when the status code is 0xFFFFFFFF (NO in step S1801), the process proceeds to step S1802, where the reading side program obtains the identification name of the new shared memory.

In a specific process of step S1802 above, the reading side program reads the fifth and subsequent bytes from the beginning of the shared memory, and obtains the identification name of the new shared memory. Next, in step S1803, the reading side program closes the old shared memory. Next, in step S1804, the reading side program opens a new shared memory. As a result of the above, the process for starting to use the new shared memory in the reading side program is completed.

If the OS is Windows®, when the shared memory is closed from all of the programs referring thereto, the area of the shared memory is deleted from the system. As a result of performing such processing as described above, it becomes possible to re-allocate the shared memory.

OTHER APPLICATION EXAMPLES

The use of the inter-program communication method according to the above-described embodiments makes it possible to localize the inter-program communication process. Therefore, the processes for the inter-program communication can be encapsulated in the form of inter-program communication modules. As a result, inter-program communication can be realized without causing a program developer to be conscious about the procedure of inter-program communication, and the development cost can be reduced.

As another application example of the inter-program communication method in the above-described embodiments, a description is given next of the overview of a technique for forming the inter-program communication process described above as a module.

In the inter-program communication method according to the above-described embodiments, the commands shown in FIG. 7 are exchanged only. Here, the fact that the commands other than the DECODE command among the commands shown in FIG. 7 can respond automatically are described below.

Regarding the value that is returned when the SEND_MESSAGE_ID command is received, the communication message ID is determined at the time that this command is received. The same also applies to the value of the window handle which should be returned when the SEND_WINDOW_HANDLE command is received. Therefore, these two commands can respond automatically at the beginning of the routine for processing the communication message ID.

Next, the processes of the END_PROCESS command and the END_PARENT command after these are received are determined. In the case of the END_PROCESS command, the communication need only be disconnected by initializing the information for the inter-process communication. In the case of the END_PARENT command, the program ending process is started only. In a case where the OS is Windows®, when a WM_CLOSE message is sent to the root window of the program, the program ending process is started. Therefore, the process for this part is able to respond automatically similarly to the SEND_MESSAGE_ID command and the SEND_WINDOW_HANDLE command.

Furthermore, for the process of the initialization phase 51, since necessary information is transmitted at the startup time option of the program, a determination as to whether the program is started up from another program is possible by analyzing the startup time option. Furthermore, since the window handle of the communication party and the communication message ID can be obtained at the time when the analysis is completed, it is only necessary to notify the window handle of the program and the communication message ID.

Regarding the sharing of the list of files, since the identification name of the shared memory is transmitted at the time that the communication path is established as described above, the sharing of the file name becomes possible without causing the program developer to be conscious that the shared memory is used.

As has thus been described, in this inter-program communication method, most of the parts necessary for communication can be concealed from the program developer. As a result of concealing the communication part from the program developer, the communication timing can be made common, and smooth inter-program communication can be realized. As a result, for example, when image data is transferred among the programs as in the above-described embodiments, the advantage that the communication procedure is localized using this inter-program communication inter-program communication method becomes more conspicuous.

In the above-described embodiments, the program for realizing each process shown in FIGS. 5, 8 to 11, 13 to 15, and 17 to 19 is read into the primary storage 102, and the CPU 101 executes the program, thereby realizing the functions thereof. The above-described embodiments are not limited to this example, and the entirety or some of the functions of each process may be realized by hardware.

The above-described secondary storage 103 may be formed of a magneto-optical disk unit, a non-volatile memory such as a flash memory, a read-only recording medium such as a compact disc read-only memory (CD-ROM), a volatile memory other than random access memory (RAM), or a computer-readable and writable recording medium by a combination thereof.

Furthermore, each process may be performed in such a manner that the program for realizing the function for performing various kinds of processes in FIGS. 5, 8 to 11, 13 to 15, and 17 to 19 is recorded on a computer-readable recording medium, the program recorded on this recording medium is read into the computer, and the computer executes the program. The phrase "computer system" referred to herein includes the OS and hardware such as peripheral devices.

The phrase "computer-readable recording medium" refers to a portable medium such as a flexible disk, a magneto-optical disk, a ROM or a CD-ROM, and a storage device such as a hard disk incorporated in the computer system. Furthermore, the phrase "computer-readable recording medium" includes a memory such as a volatile memory (RAM), which holds a program for a fixed period of time, inside a computer system that serves as a server or a client when a program is transmitted via a network such as the Internet or a communication line such as a telephone line.

The above-described program may be transmitted from the computer system, in which this program is stored in its storage device, to another computer system via a transmission medium, or transmission waves in the transmission medium. Here, the phrase "transmission medium" for transmitting the program refers to a medium that has functions to transmit information, like a network (communication network) such as the Internet and a communication line such as a telephone line.

The above-described program may also realize some of the above-described functions. Furthermore, the program may be a so-called difference file (difference program) by which the above-described functions can be realized by a combination with the program which has already been recorded in the computer system.

Furthermore, a program product, such as a computer-readable recording medium in which the above-described program is recorded, can also be applied as an embodiment of the present invention. The above-described programs, the recording medium, the transmission medium, and the program product are included in the scope of the present invention.

As a result, in the inter-program communication apparatus, the inter-program communication method, the computer-readable recording medium, and the program according to the present invention, a communication path is established between the first program and the second program. A memory area of a shared memory shared by the first program and the second program is established. Specific information for specifying the medium object and request information for requesting a processing of a medium object specified by the specific information are notified from the first program to the second program by using the communication path established. The second program performs a process corresponding to the request information on the medium object specified by the notified specific information. At this time, by storing the data of the medium object body and the attached information attached to the medium object after the processing in the shared memory, the data of the medium object body after the processing and the attached information after the processing are transferred from the second program to the first program. Therefore, when the first program and the second program process one medium object in a coordinated manner, inter-program communication can be realized with a lesser amount of processing load due to the following features: (1) The communication path between the two programs is restricted. (2) The data of the medium object body generally having a large data size and the attached information are transferred via the shared memory.

That is, since the communication path is restricted, an extra communication management process does not occur. Furthermore, since data having a large data size is shared by the shared memory, the process in which, as in a conventional case, when there is no shared memory, the data is moved to the memory area allocated by each program each time each program processes data can be omitted.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An inter-program communication apparatus for performing inter-program communication between a first program and a second program which are capable of processing a common medium object in a coordinated manner, the inter-program communication apparatus comprising:

communication path establishment means for establishing a communication path between the first program and the second program;

shared-memory allocation means for allocating a memory area of a shared memory shared by the first program and the second program;

notification means for notifying, from the first program to the second program using the communication path established by the communication path establishment means, specific information for specifying the common medium object and request information for requesting a processing of the common medium object specified by the specific information;

transfer means for, when the second program performs the processing corresponding to the request information on the common medium object specified by the specific information notified by the notification means, transferring from the second program to the first program, by storing data of a common medium object body after the processing and attached information attached to the common medium object body in the shared memory allocated by the shared-memory allocation means, the data of the common medium object body after the processing and the attached information;

window control means for controlling a display position and a size of a window of the first program to be the same as a display position and a size of a window of the second program based on window identification information and a message identifier used by the communication path establishment means, the first program being different from the second program, and the window control means displaying the window of the second program at the same display position and the same size as those of the first program, and thereafter, controlling the window of the first program to a non-display state; and status control means for performing control in such a manner that an input signal to the first program is ignored immediately before the second program is started up when the window control means performs a process of changing a display from the window of the first program to the window of the second program, and for resetting a state in which the input signal to the first program is ignored after coordination between the first program and the second program is established.

2. An inter-program communication apparatus according to claim 1, wherein the first program and the second program operate in one computer capable of concurrently executing a plurality of programs.

3. An inter-program communication apparatus according claim 1, wherein the communication path establishment means uses the window identification information and the message identifier for specifying a window processing function in a window system for controlling windows of the first program and the second program.

4. An inter-program communication apparatus according to claim 3, wherein the first program starts up the second program, and the communication path establishment means transmits start-up time parameters including at least first window identification information, which is the window identification information in the window of the first program, and a first message identifier, which is the message identifier in the window of the first program.

5. An inter-program communication apparatus according to claim 4, wherein, when the start-up time parameters are transmitted to the second program, the communication path establishment means transmits communication path information including at least second window identification information, which is the window identification information of the window of the second program, and a second message identifier, which is the message identifier of the window of the second program, to the first program specified as a transmission destination based on the start-up time parameters.

6. An inter-program communication apparatus according to claim 4, wherein, in the shared memory, a memory area allocated by the shared-memory allocation means is specified based on of memory identification information, and the communication path establishment means causes the memory identification information to be included in the start-up time parameters and the communication path information.

7. An inter-program communication apparatus according to claim 1, wherein, when the common medium object contains image data, the notification means notifies the request information including a combination of one or more of resolution, color depth, and color-space identification information of the image data from the first program to the second program.

8. An inter-program communication apparatus according to claim 7, wherein, when the second program is an image processing program for correcting or processing the image data, and the request information contains a combination of one or more of the resolution, the color depth, and the color-space identification information of the image data, the second program performs processing corresponding to only an executable request among a plurality of requests contained in the request information, on the common medium object specified by the specific information.

9. An inter-program communication apparatus according to claim 8, wherein, when there is a request that is not performed in a process of the second program despite the request being made in the request information, the first program performs a part of or all of processing corresponding to the request that is not performed on the common medium object which is processed by the second program.

10. An inter-program communication apparatus according to claim 1, wherein, when the common medium object contains image data, attached information stored in the shared memory by the transfer means contains information during photographing time, which is information on photographing of the image data, and/or printing information for correcting the image data when the image data is printed.

11. An inter-program communication apparatus according to claim 10, further comprising correction means for reading the image data processed by the second program from the shared memory and for correcting the image data by using the information during photographing time and/or the printing information when the first program is an image print program for allowing a print device to print the image data, and at least the information during photographing time and/or the printing information are contained in the attached information.

12. An inter-program communication apparatus according to claim 1, further comprising re-allocation means for allocating a memory area which serves as a new shared memory and for re-allocating data of the common medium object body and the attached information to the new shared memory when the size of data in which the data of the common medium object and the attached information are combined is greater than memory size of the shared memory.

13. An inter-program communication apparatus according to claim 1, wherein some of or all of the communication path establishment means, the shared-memory allocation means, the notification means and the transfer means are implemented in the first program and the second program.

14. An inter-program communication method for performing inter-program communication between a first program and a second program capable of processing a common medium object in a coordinated manner, the inter-program communication method comprising:
   establishing a communication path between the first program and the second program;
   allocating a memory area of a shared memory shared by the first program and the second program;
   communicating, from the first program to the second program via the communication path, specific information for specifying the common medium object and request information for requesting a processing of the common medium object specified by the specific information;
   when the second program performs the processing corresponding to the request information on the common medium object specified by the specific information, transferring from the second program to the first program, by storing data of a medium object body after the processing and attached information attached to the medium object body in the shared memory, the data of the common medium object body after the processing and the attached information;
   controlling a display position and a size of a window of the first program to be same as a display position and a size of a window of the second program based on window identification information and a message identifier, displays the window of the second program at the same display position and the same size as those of the first program, and thereafter, controls the window of the first program to a non-display state; and
   performing control in such a manner that an input signal to the first program is ignored immediately before the second program is started up when a process of changing a display from the window of the first program to the window of the second program, and for resetting a state in which the input signal to the first program is ignored after coordination between the first program and the second program is established.

15. A computer-readable recording medium having recorded thereon a program for use with an inter-program communication apparatus for performing inter-program communication between a first program and a second program capable of processing a common medium object in a coordinated manner, the program allowing the inter-program communication apparatus to execute:
   establishing a communication path between the first program and the second program;
   allocating a memory area of a shared memory shared by the first program and the second program;
   communicating specific information for specifying the common medium object and request information for requesting a processing of the common medium object specified by the specific information from the first program to the second program by using the communication path;
   when the second program performs the processing corresponding to the request information on the common medium object specified by the specific information notified, transferring from the second program to the first program, by storing data of a medium object body after the processing and attached information attached to the medium object body in the shared memory, the data of the common medium object body after the processing and the attached information;
   controlling a display position and a size of a window of the first program to be same as a display position and a size of a window of the second program based on window identification information and a message identifier, displays the window of the second program at the same display position and the same size as those of the first program, and thereafter, controls the window of the first program to a non-display state; and
   performing control in such a manner that an input signal to the first program is ignored immediately before the second program is started up when a process of changing a display from the window of the first program to the window of the second program, and for resetting a state in which the input signal to the first program is ignored after coordination between the first program and the second program is established.

* * * * *